(12) United States Patent
Butler et al.

(10) Patent No.: US 11,682,898 B2
(45) Date of Patent: *Jun. 20, 2023

(54) CONFIGURABLE MODULAR HAZARDOUS LOCATION COMPLIANT CIRUIT PROTECTION DEVICES, SYSTEMS AND METHODS

(71) Applicant: EATON INTELLIGENT POWER LIMITED, Dublin (IE)

(72) Inventors: Andrew Butler, Baldwinsville, NY (US); Joseph Michael Manahan, Manlius, NY (US); Adam Ledgerwood, Syracuse, NY (US); Graig DeCarr, Cicero, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/686,109

(22) Filed: Mar. 3, 2022

(65) Prior Publication Data

US 2022/0190594 A1 Jun. 16, 2022

Related U.S. Application Data

(63) Continuation of application No. 16/723,437, filed on Dec. 20, 2019, now Pat. No. 11,303,111.

(60) Provisional application No. 62/784,997, filed on Dec. 26, 2018.

(51) Int. Cl.
*H02H 9/00* (2006.01)
*H01H 83/20* (2006.01)

(52) U.S. Cl.
CPC ....... *H02H 9/001* (2013.01); *H01H 2083/201* (2013.01)

(58) Field of Classification Search
CPC ............ H02H 9/001; H01H 2083/201; H01H 2300/044; H01H 2009/544
See application file for complete search history.

(56) References Cited

U.S. PATENT DOCUMENTS

| 2006/0077608 | A1* | 4/2006 | Speno | G06Q 10/06 361/93.1 |
|---|---|---|---|---|
| 2010/0131164 | A1* | 5/2010 | Carter | B60L 50/52 701/61 |
| 2011/0133582 | A1* | 6/2011 | Bingler | H02K 11/33 310/71 |
| 2017/0265316 | A1* | 9/2017 | Grunow | G06F 21/86 |

* cited by examiner

*Primary Examiner* — Adolf D Berhane
*Assistant Examiner* — Afework S Demisse
(74) *Attorney, Agent, or Firm* — Merchant & Gould P.C.

(57) ABSTRACT

Modular circuit protection devices and configurable panelboard systems include arc-free operation, thermal management features providing safe operation in hazardous environments at lower cost and without requiring conventional explosion-proof enclosures and without entailing series connected separately provided packages such as circuit breaker devices and starter motor contactors and controls.

20 Claims, 13 Drawing Sheets

CONFIGURABLE MODULAR HAZARDOUS LOCATION COMPLIANT CIRUIT PROTECTION DEVICES, SYSTEMS AND METHODS

CROSS REFERENCE TO RELATED APPLICATIONS

This application is a Continuation application of U.S. application Ser. No. 16/723,437 filed Dec. 20, 2019, which claims the benefit of U.S. Provisional Application Ser. No. 62/784,997 filed Dec. 26, 2018, the complete disclosure of which is hereby incorporated by reference in its entirety.

BACKGROUND OF THE INVENTION

The field of the invention relates generally to circuit protection devices, and more specifically to lower cost, configurable modular implementation of hazardous environment compliant circuit protection devices with enhanced safety, versatility and functionality in a hazardous location.

Various different types of circuit protection devices exist to satisfy the needs of electrical power systems providing electrical power to various electrical loads. For example, various different devices and assemblies are known that provide disconnect functionality between a power supply circuit and an electrical load. With such devices, output power may be selectively switched from a power supply either manually or automatically to facilitate service and maintenance of the electrical power system, as well as to address electrical fault conditions. Circuit breaker devices and fusible disconnect switch devices are two well-known types of devices that each provide a different capability to respond to overcurrent and electrical fault conditions and to electrically isolate load-side electrical equipment from line-side power supply circuitry, thereby protecting the load-side equipment and circuitry from otherwise damaging overcurrent conditions in the electrical power system.

While known circuit protector disconnect devices are available that satisfy the needs of many electrical systems, they remain disadvantaged in some aspects for certain types of electrical systems and applications in which the circuit protectors are located in hazardous locations. Existing circuit protector disconnect devices therefore have yet to completely meet the needs of the marketplace. Improvements are accordingly desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Figure 1:
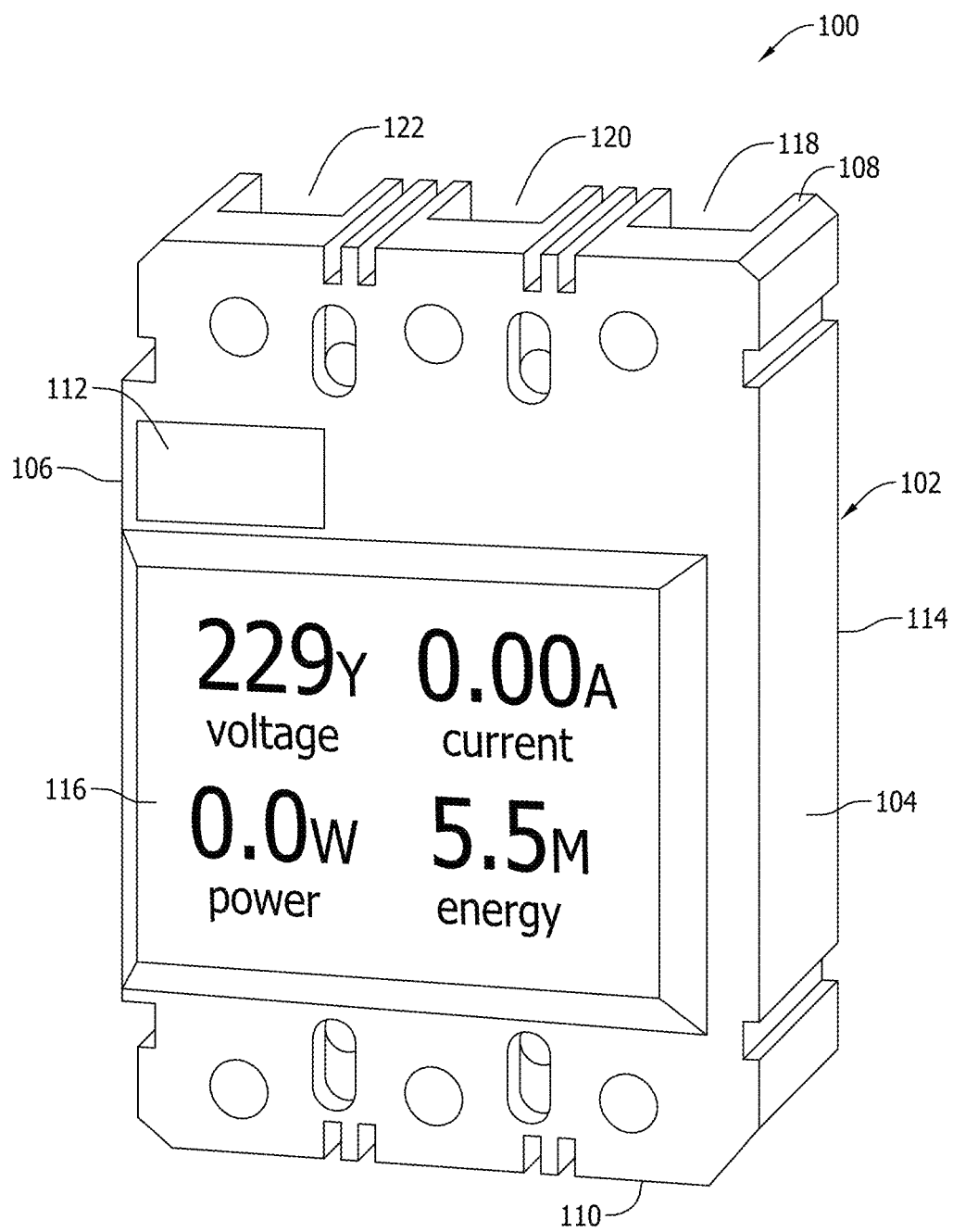
FIG. 1 is a perspective view of a compliant, hazardous location arc-less circuit protection device according to a first exemplary embodiment of the invention.

In order to understand the inventive concepts described herein to their fullest extent, set forth below is a discussion of the state of the art as it relates to issues posed by electrical power systems operating in hazardous locations, followed by exemplary embodiments of circuit protection devices, systems and methods addressing such issues and meeting longstanding but unfulfilled needs in the art.

I. State of the Art

Electrical power systems sometimes operate within hazardous environments presenting a risk of explosion via ignition of a surrounding gas or vapor dusts, fibers, or flyings. Such hazardous environments may arise in, for example only, petroleum refineries, petrochemical plants, grain silos, wastewater and/or treatment facilities, among other industrial facilities, wherein volatile conditions are produced in the ambient environment and present a heightened risk of fire or explosion. A temporary or sustained presence of airborne ignitable gas, ignitable vapors or ignitable dust, or otherwise flammable substances presents substantial concerns regarding safe and reliable operation of such facilities overall, including but not limited to safe operation of the electrical power system itself, which in some instances by virtue of conventional circuit protector devices may produce ignition sources in normal operation and in the presence of an electrical fault. As such, a number of standards have been promulgated relating to electrical product use in explosive environments to improve safety in hazardous locations in view of an assessed probability of explosion or fire risk.

For example, Underwriter's Laboratories ("UL") standard UL 1203 sets forth Explosion-Proof and Dust-Ignition-Proof Electrical Equipment criteria for hazardous locations. Explosion-Proof and Dust-Ignition-Proof enclosures are presently available to enclose or contain electrical products, including but not necessarily limited to circuit protection devices that are not themselves Explosion-Proof or Dust-Ignition-Proof. In combination with appropriate Explosion-Proof and Dust-Ignition-Proof enclosures, electrical equipment manufacturers may receive UL certification of compliance with the applicable rating standards for hazardous locations, and UL certification is an important aspect of a manufacturer's ability to successfully bring products to market in North America or any other market accepting of UL standard UL 1203.

The National Electric Code (NEC) generally classifies hazardous locations by class and division. Class 1 locations are those in which flammable vapors and gases may be present. Class II locations are those in which combustible dust may be found. Class III locations are those which are hazardous because of the presence of easily ignitable fibers or flyings. Considering Class 1, Division 1 covers locations where flammable gases or vapors may exist under normal operating conditions, under frequent repair or maintenance operations, or where breakdown or faulty operation of process equipment might also cause simultaneous failure of electrical equipment. Division 1 presents a greater risk of explosion than, for example, Division 2 where flammable gases or vapors are normally handled either in a closed system, confined within suitable enclosures, or are normally prevented by positive mechanical ventilation.

The International Electrotechnical Commission (IEC) likewise categorizes hazardous locations into Zone 0, 1, or 2 representing locations in which flammable gases or vapors are or may be airborne in an amount sufficient to produce explosive or ignitable mixtures. As defined in the IEC, a Zone 0 location is a location in which ignitable concentrations of flammable gases or vapors are present continuously or for long periods of time. A Zone 1 location is a location in which ignitable concentrations of flammable gases or vapors are likely to exist or may exist frequently because of repair or maintenance operations or because of leakage or possible release of ignitable concentrations of flammable gases or vapors, or that is adjacent to a Zone 0 location from which ignitable concentrations of vapors could be communicated.

Given that electrical devices, such as those described below, can be ignition sources in certain circumstances, explosion-proof, flame-proof, or ignition proof enclosures are conventionally provided in NEC Division 1 or 2 locations and/or IEC Zone 1 locations to house electrical devices that otherwise pose ignition risk. The terms "explosion-proof" or "flame-proof" in this context, refer to enclosures that are designed to be capable of containing an internal explosion of a specified flammable vapor-air mixture. In addition, the explosion-proof or flame-proof enclosure must operate at a safe temperature with respect to the surrounding atmosphere.

Conventional circuit breaker devices, switch devices of various types, and contactor devices are known to include input terminals connectable to power supply or line-side circuitry, output terminals connectable to one or more electrical loads, and pairs of mechanical switch contacts between the respective input terminals and output terminals. Each pair of mechanical switch contacts typically includes a stationary contact and a movable contact linked to an actuator element that displaces the movable contact along a predetermined path of motion towards and away from the stationary contact to connect and disconnect a circuit path through the device and to therefore electrically connect or disconnect the input and output terminals. When the switch contacts are opened, the device serves to isolate the electrical load(s) connected to the output terminals from the power supply connected to the input terminals. The actuator element in the mechanical switch devices described above may be automatically movable for circuit protection purposes to open the mechanical switch contacts in response to overcurrent or fault conditions in the line-side circuit and electrically isolate the electrical load(s) from electrical fault conditions to prevent them from being damaged, or the actuator element may be manually movable to electrically isolate the electrical loads from the line-side power source for energy conservation, maintenance of the load, etc.

Circuit breakers and fusible disconnect switch devices are two well-known types of devices that each provide a different type of disconnect functionality and circuit protection via mechanical switch contacts. The IEC includes the following pertinent definitions:

2.2.11 circuit-breaker mechanical switching device, capable of making, carrying and breaking currents under normal circuit conditions and also making, carrying for a specified time and breaking currents under specified abnormal circuit conditions such as those of short circuit [441-14-20]

2.2.9 switch (mechanical)

mechanical switching device capable of making, carrying and breaking currents under normal circuit conditions which may include specified operating overload conditions and also carrying for a specified time currents under specified abnormal circuit conditions such as those of short circuit [441-14-10]

NOTE A switch may be capable of making but not breaking short-circuit currents.

2.2.1 switching device device designed to make or break the current in one or more electric circuits [441-14-01]

NOTE A switching device may perform one or both of these operations.

It is seen from the definitions above that the circuit breaker as defined in IEC 2.2.11 and the mechanical switch as defined in IEC 2.2.9 differ in their capability to mechanically respond to abnormal circuit conditions. Specifically, the circuit breaker, as defined in IEC 2.2.11, can mechanically break short circuit conditions, whereas the mechanical switch as defined in IEC 2.2.9 cannot. Because of this, an electrical fuse is sometimes used in combination with the mechanical switch of IEC 2.2.9 to realize a fusible disconnect switch that can respond to a short circuit condition via operation of the fuse (i.e., an opening of the fuse) rather than operation of the mechanical switch contacts.

In either of the devices of IEC 2.2.11 and 2.2.9, the automatic circuit protection may sometimes be provided solely via the structural design and calibration of the circuit breaker structure or the structure of the fuse element(s) in the fuse, provided that each realizes predetermined time-current characteristics before opening of the circuit. The NEC has defined these two basic types of Overcurrent Protective Devices (OCPDs) as follows:

fuse—An overcurrent protective device with a circuit-opening fusible part that is heated and severed by the passage of overcurrent through it.

circuit breaker—A device designed to open and close a circuit by nonautomatic means and to open the circuit automatically on a predetermined overcurrent without damage to itself when properly applied within its rating.

The NEC also requires that circuits be provided with a disconnecting means, defined as a device, or group of devices, or other means by which the conductors of a circuit can be disconnected from their source of supply. Since fuses are designed to open only when subjected to an overcurrent, fuses generally are applied in conjunction with a separate disconnecting means (NEC Article 240 requires this in many situations), typically some form of a disconnect switch. Since circuit breakers are designed to open and close under manual operation, as well as in response to an overcurrent, a separate disconnecting means is not required.

In some types of circuit protection devices, automatic circuit protection may be realized via electrical sensors included in the device to monitor actual circuit conditions and, in response to predetermined circuit conditions as detected by the sensors, electromechanical trip features may be actuated to automatically open the movable contacts in response to detected overcurrent conditions including overload and short circuit conditions. Once tripped, the circuit breaker may be reset or reclosed to restore affected circuitry through the switch contacts, as the circuit breaker is designed to open the circuit without damage to itself, whereas a fuse opens a circuit via internal degradation of the fuse element(s) to the point where they can no longer carry electrical current. As such, the fuse must be replaced after opening to restore affected circuitry. Combinations of circuit breakers and fuses are also desirable in some instances, with selective coordination thereof, to extend the range of overcurrent conditions that may be addressed as well as to improve response times.

In contrast to the circuit protection devices described above, the "switching device" of IEC 2.2.1 as defined above refers merely to the making and breaking of current, without any reference to making or breaking overcurrent conditions (i.e., overload conditions or short circuit conditions). The "switching device" of IEC 2.2.1 therefore provides a disconnect function, but not a circuit protection function. IEC 2.2.1 also does not require a mechanical switching device at all, but to the extent that a switch device that is not a circuit breaker device actually includes mechanical switch contacts, it could nonetheless present an ignition risk when located in hazardous environments.

More specifically, an operation of mechanical switch contacts to make or break an energized circuit, whether manually actuated by a user under normal circuit conditions or automatically actuated under abnormal circuit conditions, presents a possible ignition source in a hazardous environment. Specifically, as the movable contacts are mechanically displaced away from stationary contacts (i.e., moved from a closed position to an opened position), electrical arcing between the switch contacts tends to result. Similar arcing may occur as the movable contacts are moved back towards the stationary contacts to reclose the device. If such arcing between the switch contacts is realized in the presence of a combustible gas, vapor or substance, the arcing may ignite the gas, vapor or substance. While the mechanical switch contacts are typically enclosed in housings provided with conventional circuit breakers or other mechanical switch devices as well as additional enclosures commonly utilized with panelboards or motor control centers, etc., such housings and enclosures are typically not sufficient to isolate electrical arcing from ignitable, airborne elements. For this reason, known devices including mechanical switch contacts are conventionally located in individual explosion-proof enclosures and again contained in an environmental enclosure, or a system of switches (i.e., a panelboard) that can in turn be installed in a single large explosion-proof enclosure without individual explosion-proof enclosures for the switches provided within an NEC Division 1 location to provide the necessary protection.

Of the devices described thus far, circuit breakers, while mechanically breaking a short circuit condition, experience the most intense arcing conditions and therefore have the greatest potential in terms of raw energy and temperature to ignite combustible gases, vapors or substances in a hazardous location. Considering that many industrial power systems and loads operate at relatively high voltage and high current, arc energy and arc temperatures in lower current overload conditions and normal conditions is likewise considerable and therefore poses ignition risks. In general, ignition energy resulting from the fault energy is related to the magnitude of the current being interrupted, so the higher the current being interrupted the greater the arcing potential and severity. For example, a 65 kAIC interruption is much more significant from the arcing perspective, and hence more hazardous, than a 10 kAIC interruption Available explosion-proof, flame-proof or ignition-proof enclosures are effective to provide safe operation of mechanical switch devices in an NEC Division 1 or 2 location or an IEC Zone 1 or 2 location, but generally impart additional costs, occupy valuable space in the electrical power system, and impose certain burdens to the installation and servicing of an electrical power system over time. Obtaining access to the disconnect devices inside the explosion-proof enclosures typically requires a time-consuming removal of a number of fasteners, and after any maintenance procedures are completed all the fasteners must be properly replaced to ensure the desired safety of the explosion-proof enclosure. During maintenance procedures, the area in which the disconnect devices are located are also typically decommissioned (i.e., disconnected) with associated load-side processes shut down to ensure safety during the maintenance procedure. Such decommissions are costly from the perspective of the industrial facility and limiting or shortening decommissioned downtime is important. It would therefore be desirable in some cases if the explosion-proof enclosures could be eliminated in an NEC Division 1 location while still providing safe disconnect functionality in hazardous environments. In order to do so, circuit protection devices designed to reduce ignition risks are needed, but at present generally do not exist.

Solid state disconnect devices are known that provide desirable disconnect functionality via semiconductor switches or semiconductor devices such as, but not limited to, insulated-gate bipolar transistors (IGBTs), Metal Oxide Semiconductor Field Effect Transistors (MOSFETs) and other known elements that electronically operate in a known manner to preclude current flow through the device and therefore electrically isolate line-side circuitry from load-side circuitry in response to predetermined circuit conditions without utilizing mechanical switch contacts. Such solid state switches may be implemented in circuit breaker devices or used in combination with fuses to address electrical fault conditions in an automatic manner.

Solid state switches beneficially eliminate electrical arcing associated with displacement of mechanical switch contacts as described above, but nonetheless still present possible ignition sources via heat generated by the solid state switches in use. Depending on the type and concentration of combustible elements in the hazardous location, the surface temperature of the solid state switch devices may rise to the point where spontaneous ignition may occur due to the flash temperature of the specific gas or ignitable substance in the hazardous location, even though no arcing occurs in the switching operation of the device.

Connecting terminals of solid state switch devices may also present reliability issues and possible ignition sources when used in an NEC Division 1 or 2 location or in an IEC Zone 1 or 2 location. More specifically, the terminals may tend to loosen over time when subjected to thermal cycling or vibration. Loose terminal connections may cause overheating and possible ignition sources at the location of the terminals, if not electrical arcing, under certain operating conditions. Poor quality terminal connections may also cause overheating of the conductor structure (sometimes referred to as the bus) in the device, presenting still further ignition concerns in hazardous locations. As such, the use of known solid state switching devices, without more, does not itself ensure sufficient safety in hazardous locations without complementary use of an explosion-proof enclosure in NEC Division 1 or 2 locations or IEC Zone 1 or 2 locations.

So-called hybrid disconnect devices are also known that include a combination of semiconductor switches or semiconductor devices and mechanical switch contacts. Such hybrid devices may likewise be implemented in circuit breaker devices or used in combination with fuses to address electrical fault conditions in an automatic manner. Hybrid disconnect devices present a mix of the issues discussed above from the perspective of possible ignition sources in a hazardous location, and adequate safety in the absence of a complementary use of an explosion-proof enclosure in NEC Division 1 or 2 location or IEC Zone 1 or 2 locations cannot be ensured.

II. Inventive Arc-Less Devices, Systems and Methods For Hazardous Location Compliance.

Exemplary embodiments of circuit protection devices are described herein that overcome the problems above and that provide an enhanced degree of safety for compliance with the applicable standards in NEC Division 1 or 2 location or an IEC Zone 1 or 2 location without necessarily requiring a separately provided explosion-proof, flame-proof or ignition-proof enclosure. As such, and via the elimination of such a separately provided explosion-proof, flame-proof or ignition-proof enclosure the exemplary circuit protection devices described herein may be implemented in an electrical power system at reduced cost and in a reduced amount of space in electrical panels, control centers, and the like. The exemplary circuit protection devices described herein may be provided in a modular and configurable system that facilitates a more economical installation, maintenance and oversight of the electrical power system. Method aspects will be in part explicitly discussed and in part apparent from the following description.

In a first aspect, exemplary circuit protection devices may be implemented in the form of a solid state circuit protection device having arc-less operation in switching of the device to connect or disconnect load-side circuitry through the solid state switch device, in combination with enhanced features to address possible ignition sources at the connection terminals, and/or including thermal management features to address potential overheating of conductive elements internal to the solid state switch device. When implemented in the form of a solid state circuit breaker device, such solid state circuit breakers, unlike conventional circuit breakers, therefore comply with hazardous location standards applicable to NEC Division 1 or 2 locations or IEC Zone 1 or 2 locations and thus render conventional explosion-proof, flame-proof or ignition-proof enclosures obsolete for certain applications.

In a second aspect, exemplary solid state circuit breaker devices may further be provided as modular devices facilitating an economical and configurable panelboard system capable of meeting a variety of different circuit protection needs for different power systems and electrical loads. The modular solid state circuit breaker devices may be utilized in combination with modular mechanical switching devices to ensure safe switching operation and improve response time in certain electrical conditions. Each modular solid state circuit breaker device may connect to more than one of the modular mechanical switching devices, and the current load through the modular mechanical switching devices may be shared across the modular solid state circuit breaker device when needed to ensure safe operation of the modular mechanical switching devices.

In a third aspect, a hybrid circuit protection device may be implemented in the form of a combination solid state switching device and a mechanical switch device, and further in combination with enhanced features to isolate electrical arcing between the mechanical switch contacts from the ambient environment to prevent ignition, as well as addressing possible ignition sources at the connection terminals and/or including thermal management features to avoid potential overheating of conductors in the hybrid device. Such hybrid circuit protection devices, unlike conventional hybrid circuit protection devices, therefore comply with hazardous location standards applicable to NEC Division 1 or 2 locations or IEC Zone 1 or 2 locations and render conventional explosion-proof enclosures obsolete for certain applications.

In a fourth aspect, the hybrid circuit protection device may be provided as a modular device for convenient installation on a panelboard while saving space. The modular device may also be configured with additional, built-in components and functionality such as motor starter components and associated functionality integrated into the controls of the hybrid circuit protection device, realizing additional space savings and costs by eliminating conventional and series connected, separately packaged circuit breakers and motor starter devices.

While the following discussion is made in the context of circuit breaker devices, the inventive concepts below are not necessarily limited to circuit breaker devices and instead may broadly accrue to other types of devices, examples of which are discussed above, that present similar issues from the perspective of ignition concerns in a hazardous location. Likewise, while the inventive concepts are described in the context of hazardous locations such as NEC Division 1 and 2 locations or IEC Zone 1 or 2 locations, the benefits of the concepts described are not necessarily limited to NEC Division 1 or 2 locations or IEC Zone 1 or 2 locations and instead may more broadly apply to other types of hazardous environments, and in some aspects may be beneficially provided for use in non-hazardous locations as desired.

FIG. 1 is a perspective view of a compliant, hazardous environment circuit protection device 100 according to a first exemplary embodiment of the invention. The circuit protection device 100 includes a housing 102 having opposing longitudinal sides 104, 106 and opposing lateral sides 108, 110 arranged generally orthogonally with respect to the longitudinal sides 104, 106. The housing 102 also includes a front side 112 and a rear side 114, and the front side 112 may include an optional digital display 116 that functions as a user interface for the device 100. As shown the display 116 visually indicates voltage, current, power and energy readings to a person in the vicinity of the device 100 and display 116.

The housing 102 of the device 100 is fabricated from strategically selected or otherwise custom formulated materials to withstand all possible electrical operating conditions, and specifically all possible electrical fault conditions including simultaneous fault conditions that may be presented by the electrical power system being protected in a NEC Division 1 or 2 location or an IEC Zone 1 or 2 location.

For compliance in an NEC Division 1 location or an IEC Zone 1 or 2 location, the housing structure and housing material must likewise be further formulated to provide adequate strength to withstand shock and impact forces that may be realized in an explosive environment, as well as to provide chemical resistance to withstand exposure to chemicals in the explosive environment that could otherwise negatively impact the integrity of the device 100. As used herein, "chemical resistance" refers to the strength of the housing material to protect against chemical attack or solvent reaction. Chemical resistance in the housing 102 is the opposite of chemical reactivity that may cause an undesirable chemical effect when the housing 102 is exposed to certain chemicals and/or that my undesirably generate heat and raise the temperature of the housing 102. Chemical resistance, via little or no reactivity to specified chemicals, relates to the resistivity of the housing 102 to corrosive or caustic substances in the environment, including but not limited to airborne gases and vapors. For the device 100, chemical resistance is important to all materials and structure that contributes to the hazardous location compliance described herein.

UL 1203 defines chemical testing that may be applied to determine whether any formulation of a candidate material for the housing 102 is chemically resistant for explosive environment locations. Specifically, UL 1203 chemical testing requires sample housings to be fabricated from the formulation of candidate material in the housing structure desired, and a lengthy exposure of the sample housings to saturated vapors in the air including a number of specified chemicals for a predetermined period of time. The specified chemicals for UL 1203 chemical testing include acetic acid, acetone, ammonium hydroxide, ASTM reference fuel C, diethyl ether, ethyl acetate, ethylene dichloride, furfural, n-hexane, methyl ethyl ketone, methanol, 2-nitropropane, and toluene. Different sample housings are exposed to each chemical for a predetermined period of time, and after exposure to each chemical, the sample housings are inspected to ensure that the housing structure of the samples is not compromised or shows signs of degradation via, for example, discoloration, swelling, shrinking, crazing, cracking, leaching, or dissolving. Sample housings that pass inspection are then subjected to a crush test and compared to the results of crush testing prior to the chemical exposure. If the crushing force of the chemically tested sample housings shows that the chemically tested sample housings withstand at least 85% of the corresponding crush force as tested prior to the chemical exposure, the sample housings are UL 1203 compliant.

The housing 102, via the material from which it is fabricated, should likewise exhibit chemical compatibility with specific chemicals present in a given NEC Division 1 or 2 location or an IEC Zone 1 or 2 location. Chemical compatibility refers to the stability of the housing when exposed to substances in the hazardous location environment. If the housing 102 chemically reacts to a substance in the environment, it is considered incompatible. Accordingly, compatibility testing is nonetheless advisable to confirm chemical compatibility in view of the number of different corrosive or caustic chemicals and substances used across the spectrum of industrial facilities. Different facilities involving different caustic or corrosive substances may demand housings of different materials to address issues presented. Strategic selection and custom formulation of housing materials may be needed for some explosive environments if a universally optimal housing or material formulation cannot be practically determined or economically provided. In some cases, UL 1203 compliance for the housing may obviate a need for chemical compatibility testing in selected facilities, and chemical compatibility testing may accordingly be considered optional.

The material used to fabricate the housing 102 may likewise be strategically selected or otherwise formulated, as well as formed with specific structure, to achieve thermal management and surface temperature goals for the device 100 in operation. Some housing materials may exhibit better thermal performance to distribute and dissipate heat than other materials. For example, specific polymeric resins may be selected or customized, and formulated or processed to realize a housing 102 that will improve thermal performance of the device 100 in use when protecting the electrical power system, both internally to the housing 102 and on its outer surface area such that the outer surface area temperature is maintained at a level below the temperature which could cause ignition in an NEC Division 1 or 2 location or an IEC Zone 1 or 2 location.

For any given housing material, the shape and form factor of the housing 102, including dimensions, contours, etc. may vary the overall thermal performance and surface temperature positively or negatively. For instance, for a given device rating and operating voltage and current of the electrical power system, a housing having a larger outer surface area will generally reduce surface temperature in use as compared to a housing having a smaller outer surface area. The housing structure can be designed to optimize and balance overall package size and configuration with thermal performance.

In some embodiments, the housing 102 may be fabricated from metal or metal alloys, non-metallic insulative materials such as high strength, high performance plastics, or combinations of metallic and non-metallic materials to vary thermal performance and the other considerations above, namely impact resistance and chemical resistance. Encapsulated housing constructions, in whole or in part, are likewise possible. In some instances, the interior of the housing 102 may likewise be filled in whole or in part with dielectric material, dielectric fluid, potting materials, or other filler media such as sand to contain, absorb or dissipate heat and energy of energized electrical conductors and switch components in the device 102 to ensure that the surface temperature of the housing 102 will remain below a selected target temperature to provide a device 100 having a desired temperature classification or temperature rating.

Apart from the materials utilized in its fabrication, the structure of the housing 102 could likewise be designed with heat distribution and dissipation in mind. The housing can be structured strategically to include more than one housing material throughout or at specifically targeted locations in the housing 102. Housing sub-structures could be independently fabricated and provided for assembly to provide additional thermal insulation or thermal conductivity in desired areas of the housing to selectively confine and distribute heat in a strategic manner in select locations. Wall thickness of the housing 102 could likewise be varied to provide greater or lesser degrees of thermal conductivity and heat dissipation in selected portions of the structure or in certain areas of the housing structure at the most desirable locations. Piping, channels, or pockets may be formed to strategically capture generated heat and direct it more efficiently to desired locations for dissipation. Heat sink materials and the like may be included to improve thermal absorption and dissipation.

Active cooling elements are likewise possible in which cooling fluids are passed over or through the housing structure, with the housing structure including appropriate structure to facilitate active cooling. Active cooling elements could be self-contained or separately provided such as in a panelboard application where a number of devices 100 may be provided, with an active cooling system countering the cumulative generation of heat in closely positioned devices 100 and alleviating temperature effects that the devices 100 may have upon one another. The active cooling system may include cooling fans or pumps which circulate fluids in or around a number of devices 100 to effectively manage surface temperatures. The devices 100 including temperature sensors 158 (FIG. 3) may provide feedback signals to an active cooling system to power on when needed and otherwise be powered off. Thermal electrics may also be deployed as may feedback loops with the load equipment to reduce available current through the device (thereby reducing heat).

The above thermal management considerations may be pursued in various different combinations, some of which may counteract or obviate a need for other of the considerations. For example, active cooling in some applications may obviate a need for certain features of the housing described, such as a more sophisticated shape and form factor to dissipate heat over a relatively complex surface area.

The lateral sides 108, 110 of the housing 102 each include connection recesses 118, 120, 122 for respective connection to line-side and load-side circuitry. In the example shown in FIG. 1, three connection recesses 118, 120, 122 are provided for respective connection to a three phase power supply on one of the sides 108, 110 and to three phase load-side equipment on the other. The power supply and load may each operate with alternating current (AC) or direct current (DC). The device 100 as shown is configured as a circuit breaker and therefore provides automatic circuit protection in response to predetermined overcurrent conditions, which may be selected by the user within a certain range input to the device 100 via the display screen 116, via another user interface including a remote interface, and/or pre-programmed into the device. The device 100 may operate according to specified time-current curves or trip profiles suitable to provide adequate protection for connected loads.

The display 116 may be multi-functional to display different screens in response to user activation. In some embodiments the display 116 may be touch sensitive with the user making selections via touching selected areas of the display as prompted. Input selectors such as buttons, knobs, etc. may be separately supplied from the display 116 for interactive by a user in relation to the display. An input selector such as a toggle switch may also be provided separately from the display 116 to serve as manually operable on/off switches that may intuitively be manually operated by a user. In this case, the toggle switch may emulate a traditional toggle switch to affect a change of state to "on" or "off", it may do so without displacement of mechanical switch contacts because, as explained below, the device 100 does not include mechanical switches. Alternatively, an on/off feature may be built into the display 116 for convenient use by an operator to achieve disconnect switch functionality to connected load side equipment.

The display 116 may be multi-functional to display different screens in response to user activation. In some embodiments the display 116 may be touch sensitive with the user making selections via touching selected areas of the display as prompted. Input selectors such as buttons, knobs, etc. may be separately supplied from the display 116 for user input in relation to prompts or information presented on the display 116. It is recognized, however, that the display or array of displays 116 can be considered optional in certain embodiments and need not be included at all. In further embodiments, additional input/output elements may be provided, whether in the form of a display or other interfaces for user interaction with the device both locally and remotely.

Figure 2:
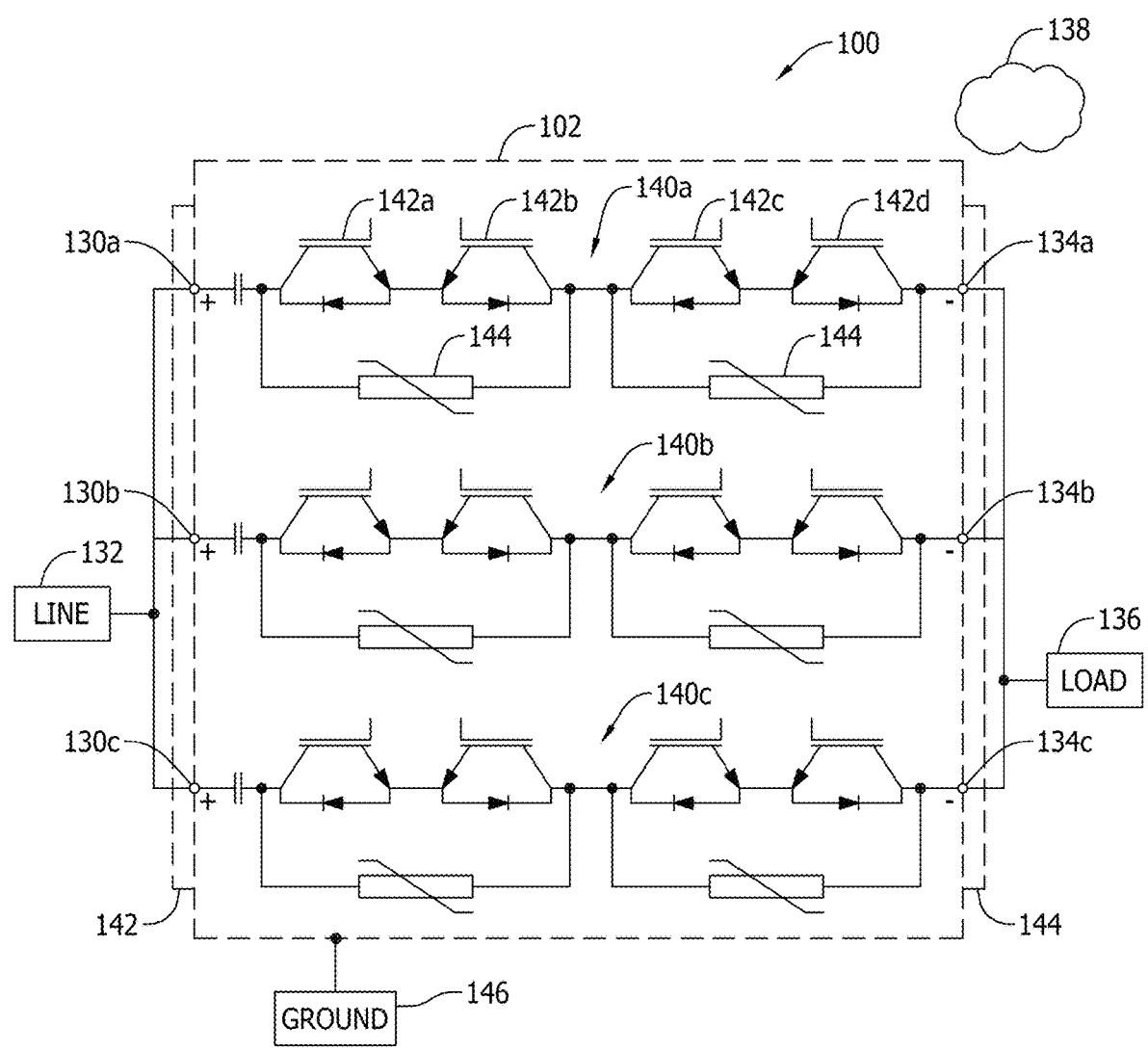
FIG. 2 is a simplified schematic diagram of the circuit protection device shown in FIG. 1 in an exemplary solid state configuration.

FIG. 2 is a simplified schematic diagram of the circuit protection device 100 in an exemplary solid state configuration. The device 100 includes input terminals 130a, 130b, 130c each connected to one phase of a three phase power supply indicated as line-side circuitry 132 in FIG. 2 via connecting cables, conduits, or wires. The device 100 further includes output terminals 134a, 134b, 136c each connected to load-side circuitry 136 such as motors, fans, lighting devices, and other electrical equipment in an industrial facility wherein ignitable gas, vapors or substances may be airborne as indicated at 138. The output terminals 134a, 134b, 136c may likewise connect to the electrical loads via connecting cables, conduits, or wires. Optionally, the device 100 may further include additional elements such as auxiliary contacts and auxiliary connections, shunt trip features, undervoltage release features, communication ports and communication elements, power ports for communication and other purposes, etc.

In between each pair of input terminals 130a, 130b, 130c and output terminals 134a, 134b, 136c are solid state switch devices arranged as indicated at 140a, 140b and 140c. The exemplary arrangement includes series connected pairs of insulated-gate bipolar transistors (IGBTs) 142a, 142b, 142c, 142d respectively connected in reverse to one another, with each pair of IGBTs 142a and 142b and 142c and 142d including a varistor element 144 connected in parallel to the IGBTs. The reversed connected IGBTs in each pair precludes reverse current flow through the IGBTs from the load-side circuitry 136 to the line-side circuitry 132 in a known manner.

The IGBTs 142a, 142b, 142c, 142d in each arrangement 140a, 140b and 140c are one form of a semiconductor switch that is operable to either permit current flow between the respective input and output terminals 130a and 134a, 130b and 134b, and 130c and 134c from the line-side circuitry 132 to the load-side circuitry 136, or to preclude current from flowing through the device 100 such that the load-side circuitry 136 becomes electrically isolated from the line-side circuitry 132. Briefly, a positive voltage applied from the emitter to gate terminals of the IGBT causes electrons to be drawn toward the gate terminal across a body region thereof. If the gate-emitter voltage is at or above a threshold voltage, enough electrons are drawn toward the gate to form a conductive channel across the body region, allowing current to flow from the collector to the emitter. If the gate-emitter voltage is below the threshold voltage essentially no current can flow across the body region, such that by controlling the gate-emitter voltage current flow between the input and output terminals may be enabled or disabled to connect or disconnect the output terminals from the input terminals of the device 100 via the IGBTs. Equivalent types of semiconductor switch elements other than IGBT elements may likewise be employed, including, but not limited to, Metal Oxide Semiconductor Field Effect Transistor (MOSFET) elements, bipolar transistor elements, silicon controlled rectifier elements (sometimes referred to as thyristors), and the like. The number of semiconductor switch elements may be varied to be greater or less than the number shown in FIG. 2.

The varistor elements 144, connected in parallel to each pair of IGBTs in the arrangement shown, exhibit a relatively high resistance when exposed to a normal operating voltage, and a much lower resistance when exposed to a larger voltage, such as is associated with over-voltage conditions and/or electrical fault conditions. The impedance of the current paths through the varistors 144 are substantially lower than the impedance of the IGBTs when the varistors 144 operate in a low-impedance mode, and is otherwise substantially higher than the impedance of the IGBTs. This means that in normal conditions the high impedance of the varistors 144 causes all of the current to flow through the IGBTs, but as over-voltage conditions arise the varistors 144 switch from the high impedance mode to the low impedance mode and shunt or divert over-voltage-induced current surges away from the IGBTs to the load-side circuitry 136. As over-voltage conditions subside, the varistors 144 may return to a high impedance mode. The varistors beneficially allow, for example, motor inrush currents to flow through the device 100 while otherwise permitting the IGBTs to respond to overcurrent conditions after motor starting is complete. In other applications, however, the varistors 144 may be considered optional and may be omitted.

As a further thermal management feature, the solid state switch devices (e.g., the IGBTs) in each arrangement 140*a*, 140*b* and 140*c* may be encapsulated with a strategically selected or otherwise formulated material to improve thermal performance of the switch devices 140*a*, 140*b* and 140*c* and/or improve heat dissipation and distribution in use. The encapsulation material of the solid state switch devices 140*a*, 140*b* and 140*c* may be the same or different from encapsulation materials included in the housing construction, and specifically are targeted to control or limit the operating temperature of the silicon in the solid state switch devices in normal circuit operation or in overcurrent conditions and electrical fault conditions to prevent overheating of the switch devices themselves or overheating of the housing 102.

While exemplary solid state switching arrangements are shown and described, others are possible to achieve solid state switching functionality in an arc-less manner. As discussed above, the solid state switching devices avoid the type of arcing that mechanical switches produce, and therefore avoid such arcing from being a possible ignition source in NEC Division 1 or 2 locations or IEC Zone 1 or 2 locations.

In view of the hazardous environment in which the device 100 is to be used, reliable termination of line-side and load-side cables to the input and output terminals is important as loose connections can generate heat and reliability issues, as well as possible ignition concerns in a hazardous location. In an NEC Division 2 location or an IEC Zone 1 or 2 location, the input and output terminals may be accessible from the exterior of the housing 102. Locking terminal connection assemblies and spring-biased terminal assemblies may be utilized to accept and retain ends of the respective cables, while reducing any tendency of the cable connections to loosen over time. In view of some of the device intelligence and fail-safe features described below, however, such locking terminal assemblies and spring-biased terminal connectors may in some cases be considered optional in NEC Division 2 or IEC Zone 1 or 2 locations.

In an NEC Division 1 location, the input and output terminals may further be enclosed in additional housings portions to provide additional safety assurance. Such housing portions may be separately provided from the housing 102 or may be integrally formed as extensions of the housing 102 to isolate the input and output terminals from the explosive environment. In contemplated embodiments, removable cover elements may be provided to access the input and output terminals and complete electrical connections to the input and output terminals inside the enclosures of the housing portions. The line-side and load-side cable connections may further be established, for example, via armored cable and cable glands providing ingress protection, sealing and grounding to safely pass a line-side cable or load-side cable through the enclosures of each housing portion. When used with armored cable, a ground to earth path may be established via the cable gland. Armored cable is not necessary in all embodiments, however, and may not be used. Cable glands may be used with non-armored cable as well.

The housing 102 may be designed and fabricated with thermal management issues in mind to maintain surface temperatures below applicable limits for a given installation in a NEC Division 1 location, and in some embodiments the housing 102 may in whole or in part be explosion-proof in compliance with applicable standards for hazardous locations, albeit with a relatively smaller and more economical housing than a conventional larger and separately provided explosion-proof enclosure that would conventionally contain the entire circuit protection device. The housing 102 and any enclosures defined therein may likewise include vacuum chambers or may be filled with dielectric fluid, dielectric material or inert gas to reduce or impede electrical arcing at the terminal/cable interface or at other locations in the housing. Device intelligence and fail-safe features described below provide additional assurance and safety addressing ignition source concerns in a hazardous location, and may render some of the preceding features optional for an NEC Division 1 location.

To address possible static electricity charge buildup, which presents a possible ignition source in an NEC Division 1 location, the housing 102 is shown in FIG. 2 with connection to electrical ground 146. Briefly, static electricity is the result of an electromagnetic imbalance between negative and positive charges in an object. Charging of the housing surface may arise via surface charge involving another object, particularly for insulative portions of the housing, or via charge induction for electrically conductive portions of the housing. Surface charging can also occur during exposure to a high voltage DC power supply, which will cause ions to adhere to the housing surface.

Regardless of how surface charging actually arises, the connection to ground 142 allows any electrical charge buildup on the housing 102 to safely dissipate without creating an ignition source in combustible/hazardous areas. The housing 102 may be grounded to earth ground or chassis ground via a line wire or line conductor connected to the housing 102 on its outer surface. As such, any charging of the exterior of the housing 102 will be quickly dissipated as electrical current to ground and obviate a high voltage discharge event, typically via a spark or shock that could be generated by a person or via a tool utilized by a person in the presence of the explosive atmosphere and cause ignition.

The housing 102 itself could also be fabricated in whole in part from antistatic polymers or antistatic materials that are weakly conductive to electricity from the perspective of charge buildup, but nonetheless considered insulative and non-conductive from the perspective of the electrical power system that the device 100 is protecting. Antistatic materials may improve the housing performance relative to non-antistatic materials by reducing any tendency of the housing to charge in the first instance, and this is another consideration for strategically selecting or otherwise formulating the material(s) to be utilized in the housing fabrication. Antistatic coatings, encapsulants, or shells may be provided on the housing outer surface if desired, although chemical resistance and compatibility must still be ensured as discussed above. When the device 100 directly connects to an enclosure/system ground plane in an actual installation, dedicated ground conductors to address static electricity issues may not be necessary due to mechanical attachment and/or physical proximity to the ground plane.

While a single ground connection is shown in FIG. 2, more than one ground connection could be provided in the structure of the device 100 at any desired location. Grounding conductors may be provided interior to the device housing 102 in addition to or in lieu of a grounding conductor connecting to the exterior of the device housing 102 as described. Ground connections for the housing 102 also could be established via a cable connector such as a cable gland when armored cable that already includes a ground path to earth is utilized to make the line-side and load-side connections to the terminals 130a, 130b, 130c of the device 100. Of course, in some cases, non-armored cable could be used, with or without cable glands, while still eliminating ignition sources in the device 100 and addressing static electricity with an alternative ground connection.

In NEC Division 2 or IEC Zone 1 locations, the device 100 would typically be protected by an enclosure and therefore would not be as prone to static electricity issues and discharge events. As such, the connection to ground 146 may or not be necessary or desirable in a device 100 for use in an NEC Division 2 location or an IEC Zone 1 location and could therefore be considered optional. By virtue of the device 100, however, the enclosure containing one or more devices 100 need not be explosion-proof and the conventionally provided explosion-proof enclosure may be omitted.

Figure 3:
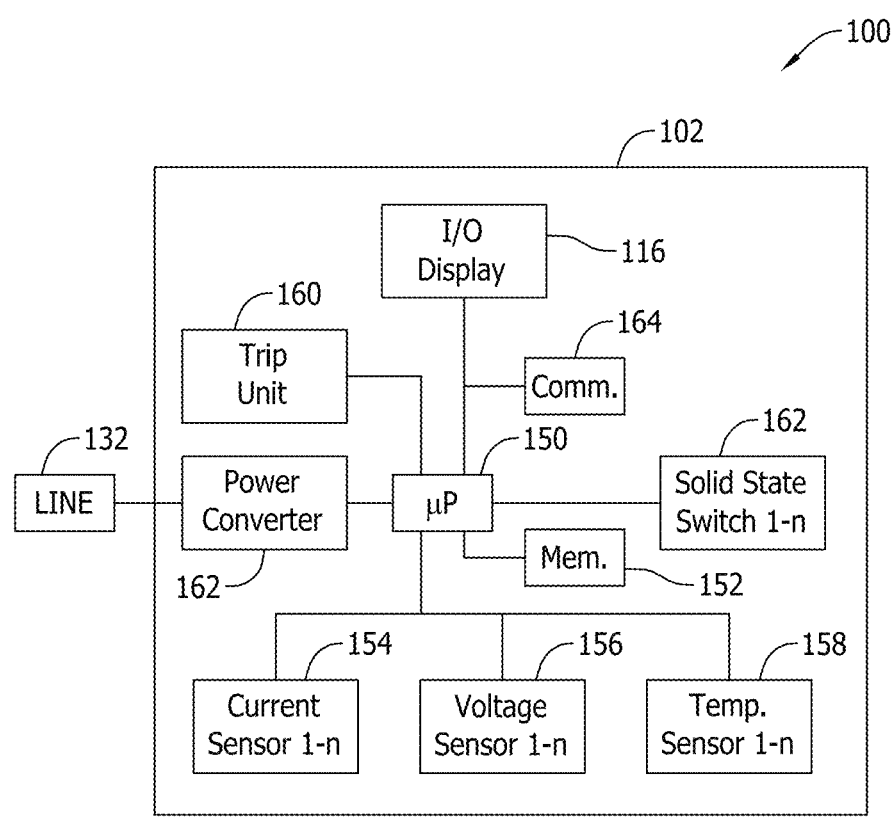
FIG. 3 is a block diagram of the circuit protection device shown in FIGS. 1 and 2.

FIG. 3 is a block diagram of the circuit protection device 100. The device 100 includes a processor-based microcontroller including a processor 150 and a memory storage 152 wherein executable instructions, commands, and control algorithms, as well as other data and information required to satisfactorily operate the device 100 are stored. The memory 152 of the processor-based device may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based" microcontroller shall refer not only to controller devices including a processor or microprocessor as shown, but also to other equivalent elements such as microcomputers, programmable logic controllers, reduced instruction set (RISC) circuits, application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based".

The devices 100 also include sensors 154, 156, 158 provided in a number 1 through n that equal the number of switching poles in the device 100. As such, for the three pole device 100 shown in FIGS. 1 and 2, three sensors of each type may be included that respectively detect current, voltage and temperature at respective locations in the device to assess actual operating circuit conditions in the device. Additional temperature sensors may optionally be provided per switching pole in further embodiments for enhanced temperature monitoring at a plurality of location in each pole. The sensors 154, 156 and/or 158, in turn, provide inputs to the processor 150. Thus, the processor 150, by virtue of the sensors 154, 156 and/or 158, is provided with real-time information regarding current passing through each of the solid state devices 162 in number 1 through n that equal the number of switching poles in the device 100.

The detected current is monitored and compared to a baseline current condition, such as a time-current curve or time-current profile that is programmed and stored in the memory 152 or the trip unit 160. By comparing the detected current with the baseline current condition, decisions can be made by the processor 150 to control the solid state switching elements 162, by controlling an output voltage to the gate-emitter voltage in the IGBT's described above, to cease conducting current to protect the load-side from damaging currents. In some embodiments, the trip unit 160 allows the user to select settings for the operation of the trip unit 160 and alter the time-current response of the device 100 within predetermined limits. As one such example, a user may select a current rating of the device 100 at a value from 50 A to 100 A, with the trip unit 160 applying the appropriate time-current curve for the selected current rating.

The detected voltage may likewise be monitored and used to make control decisions whether to operate the solid state switching elements 162 to protect the load-side circuitry and components from adverse operating conditions. Since voltage and current are related, detected voltage can be compared to detected current to facilitate an assessment of the health of the device 100, identify errors, and facilitate diagnosis and troubleshooting of the electrical power system. As other failsafe measures, voltage and current can be calculated from sensed parameters and compared to the sensor feedback to detect error conditions.

The detected temperature may likewise be monitored and used to make control decisions whether to operate the solid state switching elements 162 to protect the load-side circuitry and components from adverse operating conditions. Additionally, the detected temperature may ensure that conductors in the device 100 are operating below rated temperatures for the particular hazardous location in which it resides. For example, if the rated temperature is 200° F., the processor 150 can operate the solid state switches to disconnect and cease current flow when the operating temperature as indicated by the temperature sensors has risen to near 200° F. that could ignite airborne gases, vapors or substances in NEC Division 1 or 2 locations or IEC Zone 1 or 2 locations.

The processor 150 is in communication with the input/output display 116 to provide feedback to a user and to accept inputs made via the display 116.

In the example shown, the processor 150 receives line-side power through power converter circuitry 162. The power converter circuitry 162 includes step down components and analog to digital conversion components when necessary to supply direct current (DC) power to the processor 150 at reduced voltage in a known manner. Conversion of the line power to appropriate levels to power the electronics avoids any need for an independent power supply, such as batteries and the like or a separately provided power line for the electronic circuitry and controls that would otherwise be necessary, although in some embodiments such an independent power supply may indeed be included if needed or as desired. The controls described may be implemented on a circuit board or circuit boards in various arrangements of electronic packages, with algorithmic control features programmed and stored in the device memory.

A communication element 164 is also included that may communicate data to a remote location, as well as other device 100 as described further below to assess operation of the larger electrical power system in local and remote locations relative to any particular device 100. Wireless and non-wireless communication of data of interest, including but not limited to current data, voltage data (including waveform data), temperature data, on-off status data of the solid state switching elements, selected setting data, trip time data, etc. is possible, and such data may be stored and archived locally and remotely for analysis of the electrical power system over time. Remote actuation of the device 100 is also possible via the communication element 164.

While an exemplary architecture of the device 100 has been described, it is understood that certain elements shown in FIG. 3 may be considered optional to provide more basic functionality. Moreover, additional elements could be added to realize still further sophistication and intelligence in the operation of the device 100, as well as to provide additional functionality beyond circuit protection and disconnection functionality.

Figure 4:
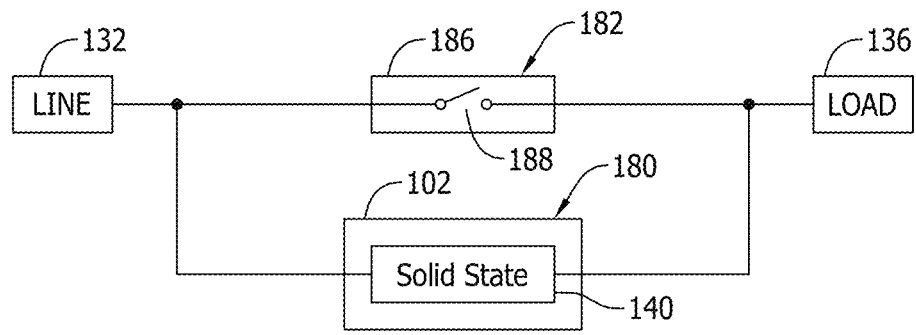
FIG. 4 is a first simplified schematic diagram of a circuit protection device in an exemplary solid state configuration in combination with a single mechanical switch device.

FIG. 4 is a first simplified schematic diagram of a circuit protection device 180 in an exemplary solid state configuration in combination with a mechanical switch device 182 and completing respective circuit paths interconnecting the line-side power supply circuit 132 and the load-side circuitry 136 and associated electrical loads.

The device 180 is similar to the device 100 described above and therefore includes the housing 102 and its features described above. Unlike the device 100 that is shown as a three pole circuit protection device having three switchable paths through the solid state switching elements described above, the device 100 is a single pole device and therefore has only one solid state switchable path via one solid state switch arrangement 140. Like the device 100, the device 180 features the housing construction, thermal management features, and arc-less switching features addressing possible ignition concerns in an NEC Division 1 or 2 location and an IEC Zone 1 or 2 location, and the device 180 may therefore be utilized in an NEC Division 1 or 2 location and an IEC Zone 1 or 2 location without need for a conventionally provided separate explosion-proof enclosure.

The mechanical switch device 182 in the example of FIG. 4 also includes a protective housing 186 and a single switchable path defined by one set of mechanical switch contacts 188. The mechanical switch device 182 is therefore a single pole switching device that in normal operation may complete a connection to, for example only, a single phase electric motor on the load-side of the device 182. In contemplated embodiments, the housing 186 is designed and constructed with similar thermal issues in mind to those described above for the housing 102 of the device 100 to avoid ignition concerns due to excessive surface temperatures of the device 182 in operation.

Additionally, the housing 186 may further include insulation materials and encapsulants may be provided in the housing 186, and an enclosure or chamber may be included in the housing 186 to physically isolate the switch contacts from the ambient environment, such that if any electrical arcing occurs at the switch contacts as the mechanical switch device 182 is opened and closed cannot ignite gases or vapors in the ambient environment. The device 182 may also include a hermetically sealed housing construction, a vacuum chamber to inhibit any tendency of electrical arcing, or be filled with inert gases and the like to inhibit or suppress electrical arcing and intensity to the maximum extent possible. In view of such a construction of the housing 186, the mechanical switch device 182 may likewise be safely utilized in a hazardous location such as NEC Division 1 or 2 or IEC Zone 1 or 2 locations without need for a conventionally provided explosion-proof enclosure.

The solid state switching device 180, which is connected in parallel to the mechanical switch device 182, beneficially reduces electrical arcing concerns in the operation of the mechanical switch device 182 while improving response times to certain operating conditions of the power system. In normal operation of the power system, the mechanical switch device 182 is normally closed to power the electrical load 136. The solid state switch device 180 is generally off or nonconductive in normal operation of the power system, such that all current flows through the mechanical switch device 182.

In an overcurrent condition or electrical fault condition, which can be detected with the sensors described above, the solid state switch device 180 is controlled to turn the solid state switch on to conduct current, allowing current to flow in the parallel circuit path to the mechanical switch device 182. The current divides across the mechanical switch device 182 and the solid state switch device 180, reducing the current load on the mechanical switch device 182. The switch contacts 188 in the device 182 can then be opened with a reduced likelihood of problematic arcing occurring. Either the current load can be reduced to a level where it is insufficient to cause electrical arcing at the switch contacts 188 of the mechanical switch device 182, or the intensity of the arcing is reduced to a lower level that does not pose ignition concerns for the mechanical switch device 182 in operation.

Likewise, in the switching of the mechanical switch device 182 in normal operation, the solid state switch device 180 can be controlled in advance to switch on and reduce the current load for switching of the mechanical switch device 182 to reduce any likelihood of arcing, or reduce the intensity of arcing. Alternatively, the sensors in the solid state switch device 180 may detect current and voltage conditions as the mechanical switch device 182 is opened, again conducting current in the parallel circuit path and reducing the current load and voltage across the mechanical switch contacts 188 to suppress or avoid arcing conditions.

FIG. 4 illustrates a first simplified schematic diagram of an exemplary hybrid circuit protection device including a one-to-one correlation of a solid state switch device 180 and a mechanical switch device 182. The solid state switch device 180 and the mechanical switch device 182 may be provided as modular devices further described below in various different combinations and connection schemes. Since the solid state switch device 180 tends to be much more expensive than the mechanical switch device 182, lower cost arrangements of the modular devices 180 and 182 are possible without comprising safety or circuit protection performance.

Figure 5:
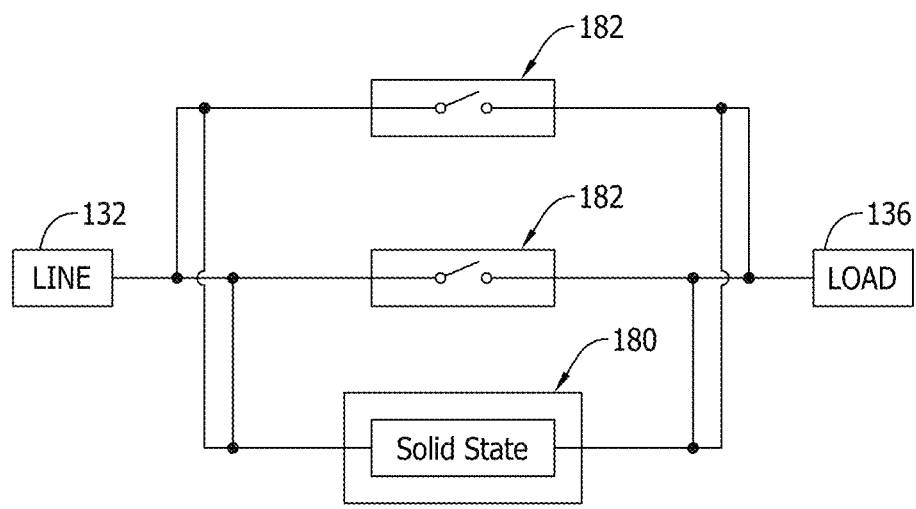
FIG. 5 is a second simplified schematic diagram of a circuit protection device in an exemplary solid state configuration in combination with a plurality of mechanical switch devices.

FIG. 5 is a second simplified schematic diagram of an exemplary hybrid circuit protection device including a solid state switch device 180 in combination with a plurality of mechanical switch devices 182. The mechanical switch devices 182 are arranged as a pair of devices each respectively defining a switchable path between the line-side power supply 132 and the load-side circuit 136 and a respective electrical load, thereby in combination defining a two pole switching device that in normal operation may complete a connection to, for example only, a two phase electric motor on the load-side of the devices 182.

The solid state switch device 180 is connected in parallel to each of the mechanical switch devices 182 and functions as described above. When controlled on and off, the solid state switch device 180 either does not conduct current or divides the current across the mechanical switch devices 182 and the solid state switch device 180. The current can be shared across only one of the mechanical switch devices 182 and the solid state switch device 180, or between both of the mechanical switch devices 182 and the solid state switch device 180 depending on electrical circuit conditions of each respective phase of electrical power being completed through the devices.

As long as the solid state switch device 180 can safely interrupt simultaneous faults in each of the power system phases connected through the switch devices 182, the arrangement in FIG. 5 provides safe operation at lower cost than the one-to-one arrangement shown in FIG. 4. When applied to a two-phase load, the one-to-one arrangement requires two solid state switch devices 180 and two mechanical switch devices 182. The arrangement in FIG. 5 is operable, by comparison, with a single solid state switch device 180 while still providing comparable safety and circuit protection performance. Again considering that solid state switch devices 180 are much more expensive than mechanical switch devices 182, the arrangement in FIG. 5 involving a pair of mechanical switch devices 182 and a single solid state switch device 180 represents significant cost savings. Also, the arrangement of FIG. 5 can operate with reduced heat relative to alternative one-to-one arrangements such as that shown in FIG. 4. The devices 180 and 182 may be provided as modular devices that may be interconnected (or not) as desired or as needed by the end use application in a hazardous environment.

The modular arrangement of FIG. 5 could be expanded to include a third mechanical switch device 182 to power a three-phase electrical load such as a three phase electrical motor. Assuming that the solid state switch device 180 can safely handle simultaneous faults presented in the three phases, safe operation for an NEC Division 1 or 2 location or an IEC Zone 1 or 2 application can be ensured. As such, three mechanical switch devices 182 and a single solid state switch device 180 protecting a three-phase load represents significant cost savings over the use of the device 100 (FIG. 1) that includes three solid state switching arrangements. In this context, the device 100 is a multi-pole device but has the one-to-one arrangement illustrated in FIG. 4 for each pole.

The modular arrangement could be further extended to protect a 4 phase electrical motor by adding a fourth mechanical switch device 182. If a single solid state switch device 180 cannot safely handle simultaneous faults on all four phases, a second solid state switch device 180 may be provided, while still lowering costs substantially over one-to-one arrangements including three solid state switch devices 180 and three mechanical switch devices 182.

On the other hand, similar arrangements and benefits can be realized in other applications. For instance, the two-mechanical switch to one solid state switch arrangement shown in FIG. 5 may be used to connect two discrete single pole circuits, while safely handling simultaneous faults in each of the discrete single fault circuits connected through the devices.

The modular concept demonstrated above is generally scalable to accommodate as many mechanical switch devices 182 as possible or practical in combination with the fewest number of solid state switch devices 180 to reduce costs as low as possible while still providing safe operation and the desired circuit protection in an NEC Division 1 or 2 location or an IEC Zone 1 or 2 location. Generalizing the arrangements above, for a power system having n phases, n mechanical switching devices 182 may be provided to power the desired electrical loads, while connecting to a number less than n of solid state switch devices 180 to share the current load of selected ones of the n mechanical switching devices 182.

The modular concept likewise applies to multi-pole switching devices. For example, the three pole circuit protection device 100 could be connected to two or more three pole mechanical switch devices 182 with similar effect and cost savings to those described above. Combinations of devices having different numbers of switching poles are likewise possible in some embodiments. For example, a four phase electrical load could be connected through a three pole solid state device 100 and a single pole solid state device 180 connected in parallel to a three pole mechanical switch device and a single pole mechanical switch device. The four phase electrical load could likewise be connected through a three pole solid state device 100 and a single pole solid state device 180 connected in parallel to a pair of two pole mechanical switch devices. Numerous combinations are possible in this regard using modular devices having different numbers of switching poles.

Likewise, multi-pole switch devices need not necessarily be used with multi-phase power systems and multi-phase loads. The three phase device 100 could be used in combination with three mechanical switch devices to power three single-phase loads. As another example, the three phase device 100 could be used in combination with three mechanical switch devices to power a two phase electrical motor and, for example, a single-phase load such as fan to cool the motor in operation, while providing circuit protection to the motor and the fan. Numerous combinations are possible in this regard using modular devices having different numbers of switching poles to interconnect power systems and electrical loads having different numbers of phases.

Figure 6:
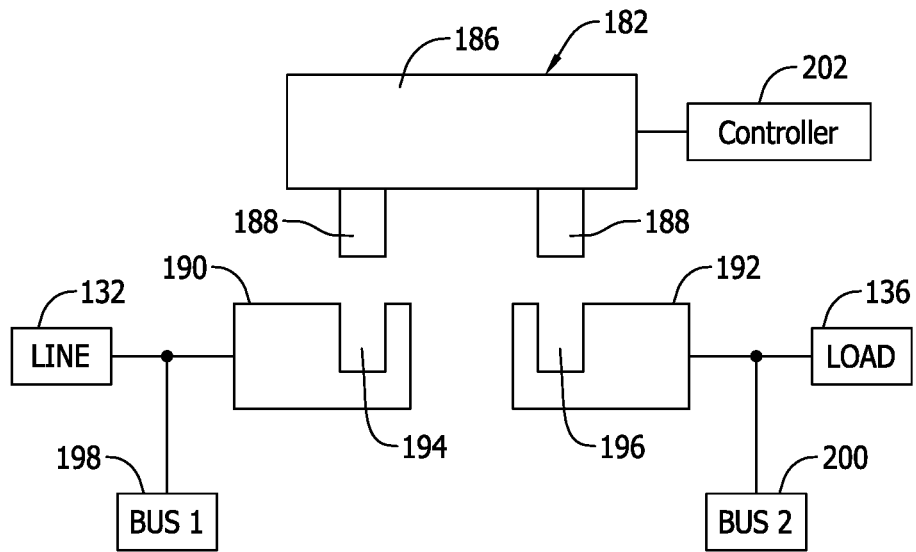
FIG. 6 illustrates an exemplary connection terminal assembly for the mechanical switch devices shown in FIG. 4.

FIG. 6 illustrates a modular mechanical switching device 182 and terminal assembly that facilitates convenient interconnections to realize the modular circuit protection arrangements described above. In the example of FIG. 6, terminal posts or pins 188 are shown projecting from the rear side of the device housing 186. The mechanical switch 188 (FIGS. 4 and 5) of the device 182 is connected between the terminal posts or pins 188 in the mechanical switching device 182.

Terminals 190 and 192 are separately provided from the device 182 and respectively include apertures 194, 196 that receive the terminal posts or pins 188. The posts or pins 188 of the mechanical switching device 182 and apertures 194, 196 of the terminals 190, 192 define mating male and female connection features to complete mechanical and electrical connection to and through the mechanical switch 188 of the device 182 and the terminals 190, 192, which in turn connect to the line-side power supply 132 and the load-side electrical circuit 136 through the bus structure of a panelboard or by wires or cables in various different embodiments.

The bus structure in the example of FIG. 6 may also include Bus 1 and Bus 2 connections 198 and 200 as shown that respectively define conductive structure in the panelboard for connection to one or more solid state switch devices 180 to realize the circuit arrangements described above in FIGS. 4 and 5. The terminals 190, 192 may be fixed to the bus structure of the panelboard in a contemplated embodiment, or can be fixed in place on another support structure such that the mechanical switch device 182 is selectively positionable relative to the terminals 190, 192 such that the mechanical switch device 182 can be removed and replaced without disturbing the connections of the terminals 190, 192 to the line-side and load-side circuitry.

The male and female connection features illustrated in FIG. 6 are exemplary only. While the mechanical switch device 182 is shown having the male connector posts and the terminals 190, 192 are shown having female apertures 194, 196 this may be effectively reversed in another embodiment to provide male connectors on the terminals and female connectors on the mechanical switch device 182. The size and shape of the posts and apertures may likewise be varied to define accept/reject features to ensure that only compatible devices can be used with compatible terminals, and also to ensure a one-way installation that prevents an inadvertent attempt to install the mechanical switch device 182 with reverse polarity. The male and female connectors may be configured to provide intrinsically safe connection and disconnection to one another, and may be configured for hot swap insertion and removal. Convenient, plug and play-type installation and removal of the mechanical switch device 182 is possible while ensuring safety of the device during operation and in the removal and replacement of the modular mechanical switch device 182. Locking or latching features may be provided on the terminals 188, 190, 192 or on the housing 186 to secure the mechanical switch device 182 and ensure a high quality electrical connection. Loose terminal connections should be avoided as they can present ignition concerns in an NEC Division 1 or 2 location or an IEC Zone 1 or 2 location.

In contemplated alternative embodiments, lug terminals and the like could be built-in to the construction of the mechanical switch device 182 instead of being separately supplied from the mechanical switch device 182. Depending on the installation, the mechanical switch device 182 including the built-in terminals may include additional housing features to enclose the built-in terminals. Secure wire or cable connections may be established to the built-in terminals via locking features, spring-biased features, and connectors to ensure high quality electrical interconnections to cabling or wiring while ensuring an adequate degree of safety for an explosive environment.

The mechanical switch device 182 is shown connected to an external controller 202 in FIG. 6. The controller 202 is programmable to provide automatic circuit protection according to a selected or predetermined time-current profile via the mechanical switch device 182. In the case of an internal controller already being provided in the device 182, the controller 202 may be optional and need not be provided. An internal or external controller may beneficially realize remote operation of the device 182.

Figure 7:
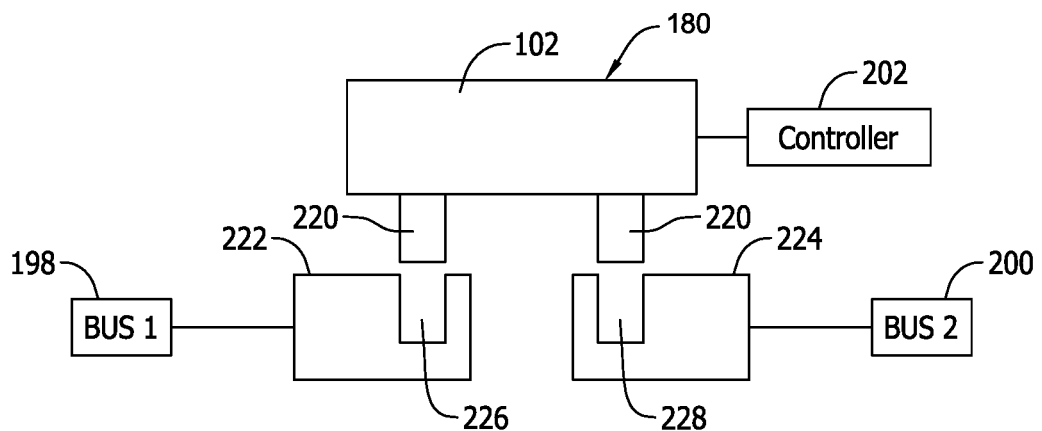
FIG. 7 illustrates an exemplary connection terminal assembly for the circuit protection device in an exemplary solid state configuration shown in FIGS. 4 and 5.

FIG. 7 illustrates an exemplary modular solid state switching device 180 and terminal assembly that facilitates convenient interconnections to realize the modular circuit protection arrangements described above in combination with modular mechanical switch devices 282 (FIG. 6).

The modular solid state switching device 180 includes terminal posts or pins 220 projecting as shown from the rear side of the device housing 102. Separately provided terminals 220 and 224 include apertures 226, 228 that receive the terminal posts or pins 220 of the modular solid state switching device 180. The posts or pins 220 and the terminal apertures 226, 228 define male and female connection features to complete mechanical and electrical connections to and through the solid state switching element in the device 280 and the terminals 222, 224 which in turn connect to Bus 1 Bus 2 connections 198 and 200 (also shown in FIG. 6) that define conductive structure in the panelboard for connection to the line 132 and the load 136 in parallel with a mechanical switch device 182. The terminals 220, 222 may be fixed to the bus structure in a contemplated embodiment, or can be fixed in place on another support structure with wire or cable connections in place, such that the solid state switch device 180 can be removed and replaced without disturbing the connections to the line-side and load-side circuitry. Alternative terminal structure described above in relation to the mechanical switching device 182 described above are likewise possible.

The male and female connection features illustrated in FIG. 7 are exemplary only. While the solid state switch device 180 is shown having the male connector posts or pins and the terminals 220, 222 are shown having female apertures 226, 228 this may be effectively reversed in another embodiment to provide male connectors on the terminals and female connectors on the solid state switch device 180. The size and shape of the posts and apertures may likewise be varied to define accept/reject features to ensure that only compatible devices can be used with compatible terminals, and also to ensure a one-way installation that prevents an inadvertent attempt to install the solid state switch device 180 with reverse polarity. The male and female connectors may be configured to provide intrinsically safe connection and disconnection to one another, and may be configured for hot swap insertion and removal. Convenient, plug and play-type installation and removal of the solid state switch device 180 is possible while ensuring safety. Locking or latching features may be provided on the terminals 220, 222, 224 or on the housing 102 to secure the solid state switch device 180 and ensure a high quality electrical connection. Loose terminal connections should be avoided as they can present ignition concerns in an NEC Division 1 or 2 location or an IEC Zone 1 or 2 location.

In contemplated embodiments, the male and female terminal connection features of the solid state switch device 180 are distinguished from the male and female terminal connection features of the mechanical switch device 182 to avoid human error in installation that may otherwise be possible. For example, the lateral and longitudinal spacing or positioning of the terminal posts or pins 220 on the rear side of the device 180 may be different from the lateral and longitudinal spacing or positioning of the terminal posts or pins of the device 182 to define accept/reject features to permit each device 180, 182 to be installed in a proper location while rejecting any attempt to install them in an improper location. As such, the mechanical switch device 182 cannot be inadvertently installed in place of a solid state switch device 180 or vice-versa. The proper operation of the combination of devices 180, 182 depends on them being properly connected to the respective terminals shown in FIGS. 6 and 7 to realize the arrangements shown in FIGS. 4 and 5.

The solid state switch device 180 is shown connected to an external controller 202 in FIG. 7. The controller 202 is programmable to provide automatic circuit protection operating to an input time-current profile via the solid state switch device 180. In the case of an internal controller already being provided in solid state switch device 180, the controller 202 may be optional and need not be provided. An internal or external controller may beneficially realize remote operation of the device 180.

Figure 8:
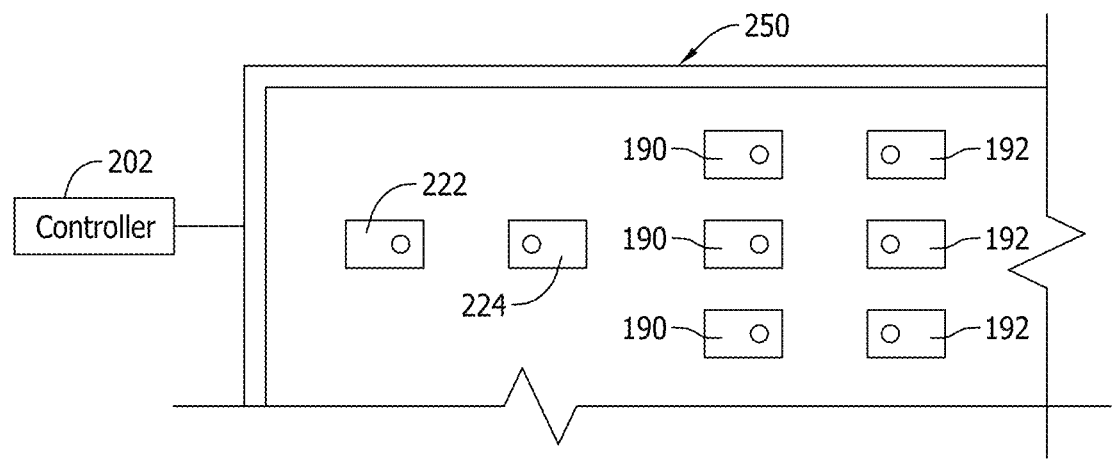
FIG. 8 is a first partial front view of a panelboard including terminal assemblies as shown in FIGS. 6 and 7.

Comparing FIGS. 7 and 8, the controller 202 is connected to each and may therefore coordinate operation of each device 180, 182 with respect to one another, and ensuring that compatible time-current characteristics are selected or realized in each device to avoid possible nuisance operation or inadvertent defeat of the desired circuit protection in use via mismatched time-current characteristics in each device.

For instance, a solid state device 180 having an ampacity rating of 100 A (or operating according to a 100 A user-selected setting) in combination with a mechanical switch device 182 having an ampacity rating of 50 A (or operating according to a 50 A user-selected setting) may compromise the intended load current sharing when needed and therefore impact the circuit protection intended, possibly defeating the load current sharing altogether depending on the specific time-current characteristics of each device. Likewise a solid state device 180 having an ampacity rating of 50 A (or operating according to a 50 A user-selected setting) in combination with a mechanical switch device 182 having an ampacity rating of 100 A (or operating according to a 100 A user-selected setting) may not produce the desired amount of load current sharing when it is actually needed.

Likewise, to the extent that the devices may include conflicting overload settings, nuisance operation may result that does not relate to load current sharing. For example, if the mechanical switching device 182 is rated well below the solid state switch device 180 (or if its selected setting is well below the solid state switch) the mechanical switching device 182 may be overly sensitive to current conditions that are not actually problematic and will therefore open and disconnect the load unnecessarily or otherwise in a way that is unintended by the user or the installer.

The controller 122 may accordingly compare and assess the device ratings and/or selected settings to detect incompatible devices and settings of the devices, reject incompatible settings, prompt a user for compatible device selections and/or generate a notification or alert while taking fail-safe measures such as automatically adjusting input settings to the nearest compatible setting that ensures circuit protection and safe operation of the device. Alternatively, the controller 202 can accept or detect user setting inputs, assess them to identify any incompatibility and instruct respective controllers in each device 180 and 182 accordingly concerning an optimal and coordinated time-current characteristic for each device 180, 182 that ensures the desired safety without compromising circuit protection.

Figure 9:
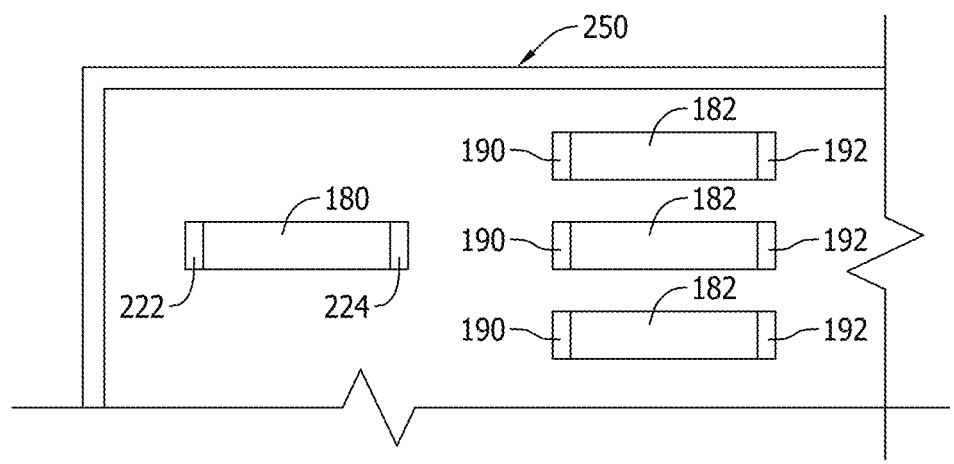
FIG. 9 is a second partial front view of the panelboard shown in FIG. 8 including the devices shown in FIGS. 6 and 7 installed.

FIG. 8 is a first partial front view of an exemplary panelboard 250 including a set of terminals 222, 224 and sets of terminals 190, 192. In the example shown, one set of terminals 222, 224 and three sets of terminals 190, 192 are mounted on the panelboard 250 in the area of the panelboard shown. The set of terminals 222, 224 are positioned to receive the terminal posts or pins 220 (FIG. 7) of the solid state switch device 182. Each set of terminals 190, 192 are positioned to receive the terminal posts or pins 188 (FIG. 6) of respective mechanical switch devices 182. The installation of the devices 180, 182 to the corresponding terminals 224, 224, 190, 192 is shown in FIG. 9. The solid state switch device 180 is shared by each of the mechanical switch devices 182 through the bus structure of the panelboard 250 in accordance with the modular circuit arrangement concepts described above to connect the solid state switch device 180 in parallel to the mechanical switch devices 182 to effect the described load current sharing.

The controller 202 may be located remotely from the panelboard 250 or may be mounted on the panelboard 250. Using the controller 202, trip settings for the mechanical switch devices 182 and/or the solid state switch devices 180 in the panel may be varied for particular installations and for particular loads. Likewise, the bus structure of the panel 250 could be configurable to effect, either via software or hardware, to interconnect mechanical switch devices 182 and solid state switch devices 180 in desired circuit arrangements, including but not limited to those described above. In contemplated embodiments, the panelboard 400 may be a single integrated circuit device with multiple programmable channels to accommodate a desired combination of single, two and three pole circuits. As such, and in the example shown in FIG. 9, the three mechanical switch devices 182 could be configured to power a three phase electrical load using all three of the mechanical switch devices 182, a two phase electrical load including only two of the mechanical switch devices 182, or to three single phase loads connected through the respective ones of the three mechanical switch devices 182. Using modular devices, modular bus configurability, and programmable controls and circuit arrangements as described, considerable variation of the panelboard 250 is possible for specific end use without having to provide different versions of panelboards and devices, or customized panelboards and devices, to meet a broad range of application in the field.

The panelboard 250 in contemplated embodiments may be safely operated without a need for conventional explosion-proof enclosures and therefore lower costs and simplify maintenance issues for the devices located on the panelboard.

Figure 10:
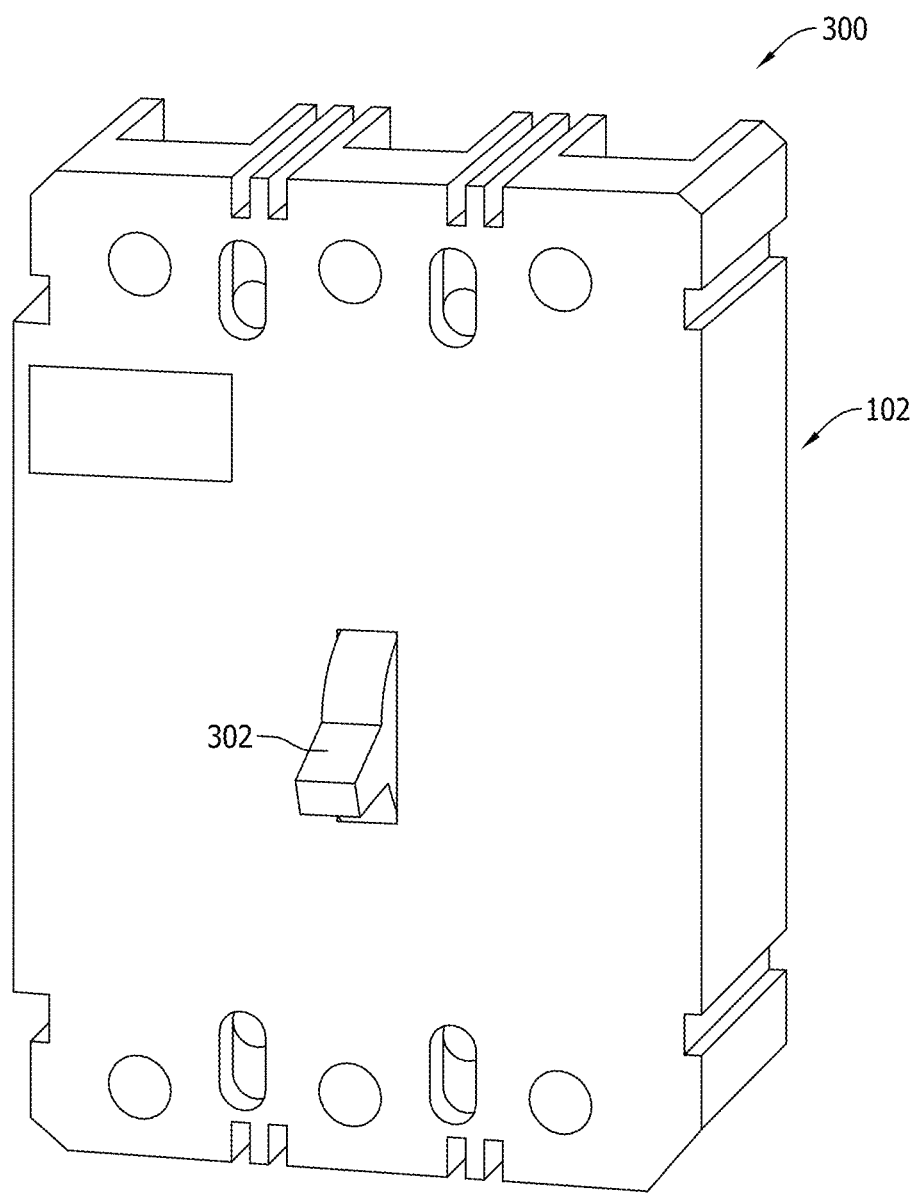
FIG. 10 is a perspective view of a compliant, hazardous location arc-less circuit protection device according to another exemplary embodiment of the invention.

FIG. 10 is a perspective view of a compliant, hazardous environment arc-less circuit protection device 300 according to another exemplary embodiment of the invention. The circuit protection device 300 includes the housing 102 described above in relation to the device 100, but omits the digital display 116 of the device 100 (FIG. 1). As shown in FIG. 302 a toggle switch 302 is accessible to a user on the upper face of the housing 102 for manual activation of the device 300 between "on" and "off" states to connect and disconnect the load-side of the device 300 from the line-side. Manual actuators other than toggle switches may be employed in other embodiments. In some cases, the display 116 could be provided in addition to or in lieu of the toggle switch 302 or another manual actuator.

Like the device 100, the device 300 may interconnect line-side or power supply circuitry and electrical loads operating via alternating current (AC) or direct current (DC). The device 300 as shown is configured as a circuit breaker and therefore provides automatic circuit protection in response to predetermined overcurrent conditions, which may be selected by the user within a certain range and input to the device a local or remote user interface, or otherwise pre-programmed into the device. The device 300 may operate according to specified time-current characteristics or time-current profiles suitable to provide adequate protection for connected loads, including but not necessarily limited to characteristics required for listing as a UL 489 circuit breaker in contemplated embodiments.

Figure 11:
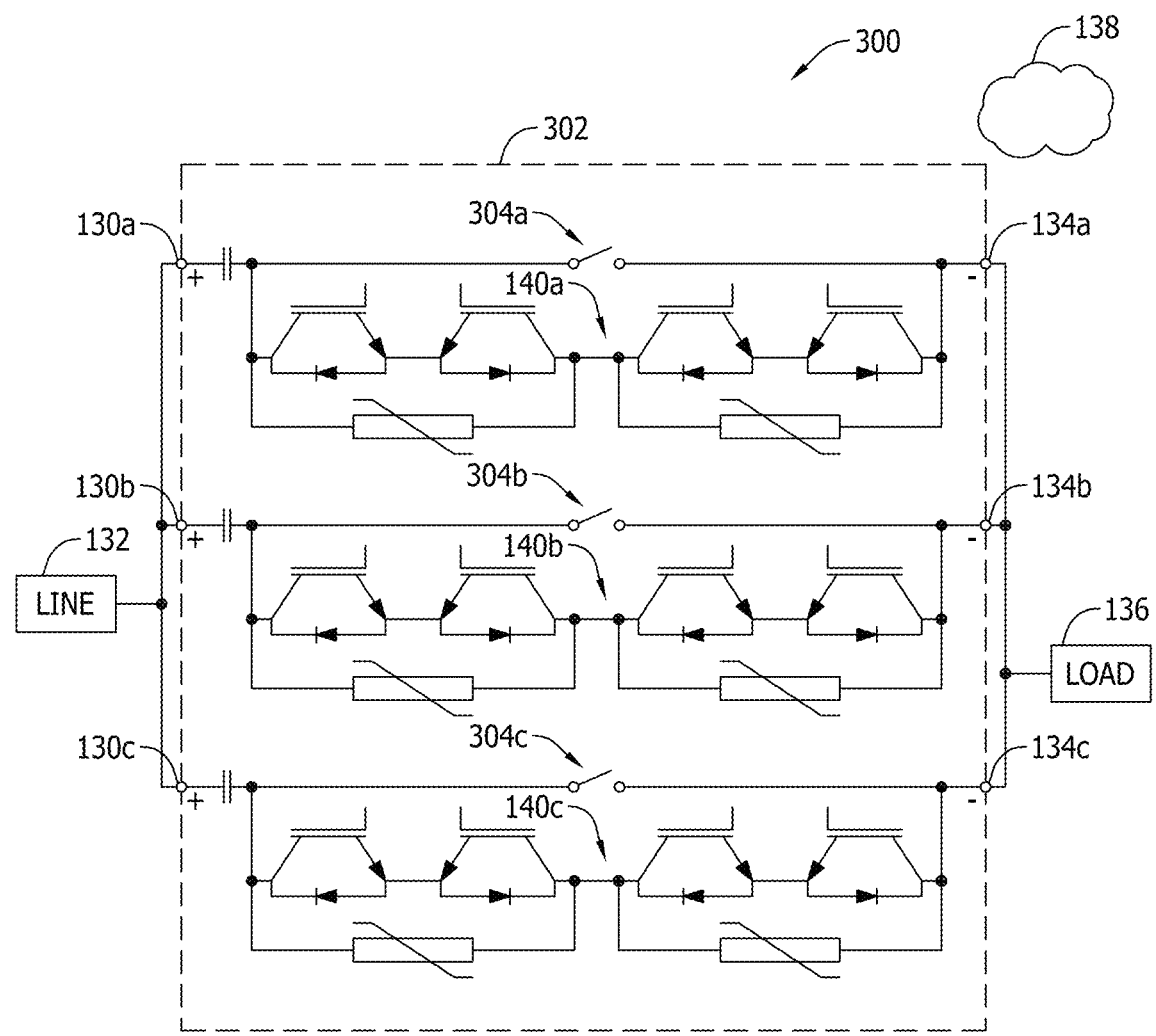
FIG. 11 is a simplified schematic diagram of the circuit protection device shown in FIG. 10 in an exemplary hybrid configuration.

FIG. 11 is a simplified schematic diagram of the circuit protection device 130 in an exemplary hybrid configuration. The device 300 includes input terminals 130a, 130b, 130c each connected to one phase of a three phase power supply indicated as line-side circuitry 132 via connecting cables, conduits, or wires. The device 300 further includes output terminals 134a, 134b, 136c each connected to load-side circuitry 136 such as motors, fans, lighting devices, and other electrical equipment in an industrial facility wherein ignitable gas, vapors or substances may be airborne as indicated at 138.

In between each pair of input terminals 130a, 130b, 130c and output terminals 134a, 134b, 136c are mechanical circuit breakers 304a, 304b, 304c and parallel connected solid state switch devices arranged as indicated at 140a, 140b and 140c. The exemplary solid state switch arrangement 140a, 140b, 140c includes series connected pairs of insulated-gate bipolar transistors (IGBTs) with each pair including a varistor element connected in parallel to the IGBTs as described above. While exemplary solid state switching arrangements are shown and described, others are possible to achieve solid state switching functionality in an arc-less manner. As discussed above, the solid state switching devices operate in an arc-less manner and therefore do not themselves present a risk of ignition insofar as arcing is concerned in a hazardous location.

The combination of the mechanical circuit breakers 304a, 304b, 304c and the solid state switching arrangements 140a, 140b and 140c can improve response times of the device 300 relative to that of the device 100. The mechanical circuit breakers 304a, 304, 304c however, operate with mechanical switch contacts and accordingly deserve some attention to a hazardous location application as arcing can be an ignition source. The solid state switching arrangements 140a, 140b and 140c that are connected in parallel to the mechanical circuit breakers 304a, 304b, 304c can limit the current in mechanical circuit breakers 304a, 304, 304c in an overload or short circuit event to reduce intensity of any arc produced to a level below that required to present an ignition concern, or otherwise preclude arcing altogether.

Figure 12:
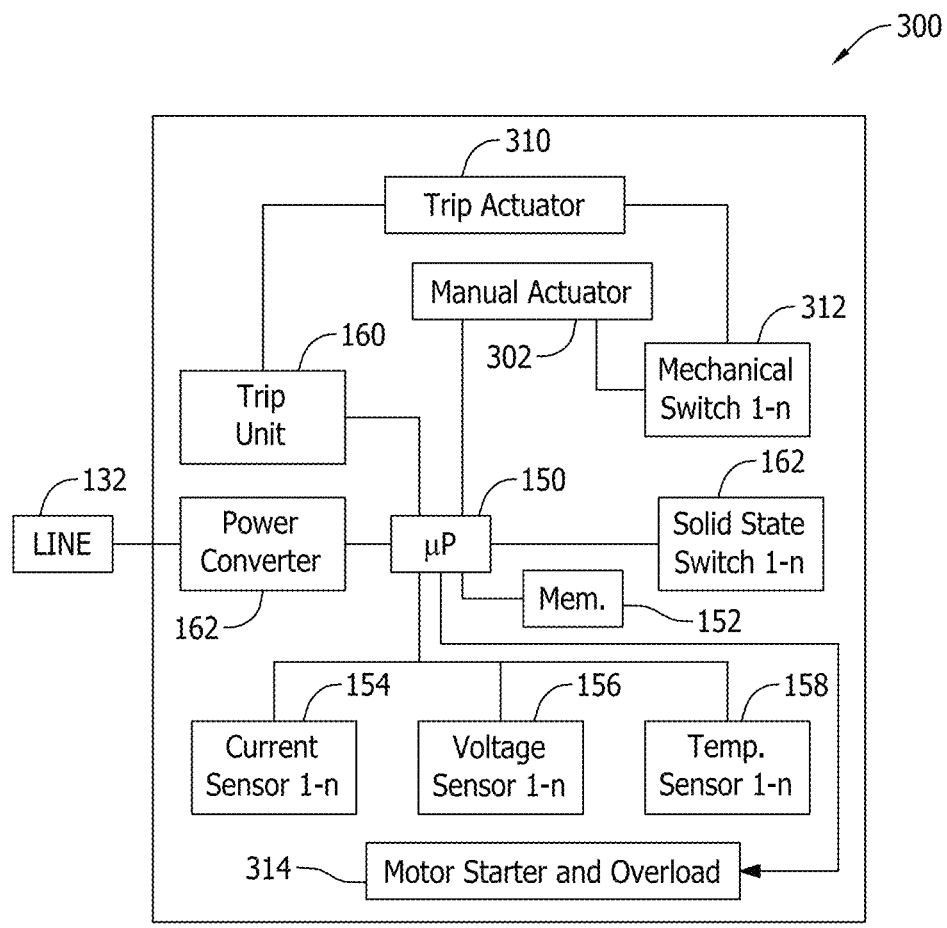
FIG. 12 is a block diagram of the circuit protection device shown in FIGS. 10 and 11.

FIG. 12 is a block diagram of the circuit protection device 300 including, in addition to the elements described above in the device 100, control inputs for the manual actuator 302, and a trip actuator 310 for operating the mechanical circuit breakers 312 including the mechanical switches. When predetermined overcurrents are expected, the trip unit 160 causes the trip actuator 310 to displace the movable switch contacts and open the circuit through the device 300. The trip actuator may be an electromagnetic member such as a solenoid that can simultaneously displace the switch contacts of each mechanical breaker provided in the device 300, with the solid state switching arrangements 140a, 140b and 140c limiting the current as the displacement of the switch contacts occurs. The manual actuator 302 can thereafter be used to reset the device 300 by closing the mechanical switches.

Additionally, the device 300 further includes motor start and motor overload components 314 inside the housing 102. The sensors in the device and the processor 150 in the device 300 implement sensor feedback and functionality of conventional and separately provided motor starter components to control motor operations in a known manner. The motor control operations include control of motor start events (including but not limited to so-called soft start events), motor stop and reversal events, motor overload events and power loss events while the motor is operating. Such motor control components and functions aim to protect and provide safe operation of the motor in specific operating conditions that may or may not relate to overcurrent or electrical fault conditions in the power system itself. The sensors and intelligence provided in the devices 300 may account for and allow motor-inrush currents and other electrical conditions within predetermined limits that otherwise could be considered undesirable from a simpler circuit protection perspective that does not consider the unique needs of electrical motor control.

While motor starter and overload components 314 are described, other dual purpose or dual function integration in the device 300 is likewise possible that likewise would reduce costs of installing and servicing electrical power systems even further by reducing the number of devices that need to be acquired, installed, and serviced in the power system, as well as conventional explosion proof enclosures associated with required devices.

The hybrid device 300 including sufficient housing structure, mechanical circuit breakers and solid state switches to enhance circuit protection capabilities and safe operation in a hazardous environment and the motor starter components is therefore economically provided in a single package that does not require an explosion-proof enclosure. The device 300 may be economically provided in lieu of a conventional arrangement of separately supplied circuit breakers, contactors and motor starter components that are series connected to one another and typically provided with conventional explosion-proof enclosures for safety in an NEC Division 2 or Division 1 location or an IEC Zone 1 or 2 location. Devices 300 may be provided in modular form including the terminal structures and assemblies described above, and may be arranged and controlled in configurable panelboard installations to power a desired number of electric motors.

The device 300 may likewise connected to electrical ground 146 to dissipate any charging of the housing surface as described above, thereby precluding a possible ignition source via static discharge as described above. In contemplated embodiments, the housing 102 of the device 300 may be fabricated from metallic or non-metallic materials. In some cases involving certain metallic or non-metallic materials, strategic selection of housing materials, filler materials and encapsulant materials is necessary in order to address static electricity concerns. Combinations of conductive and non-conductive materials, both internal to the device 300 and external to the device 300 may be utilized to provide paths to electrical ground as appropriate.

While an exemplary architecture of the device 300 has been described, it is understood that certain of the elements shown in FIG. 12 may be considered optional to provide more basic functionality, as well as additional elements could be added to realize still further sophistication and intelligence in the operation of the device 300.

Figure 13:
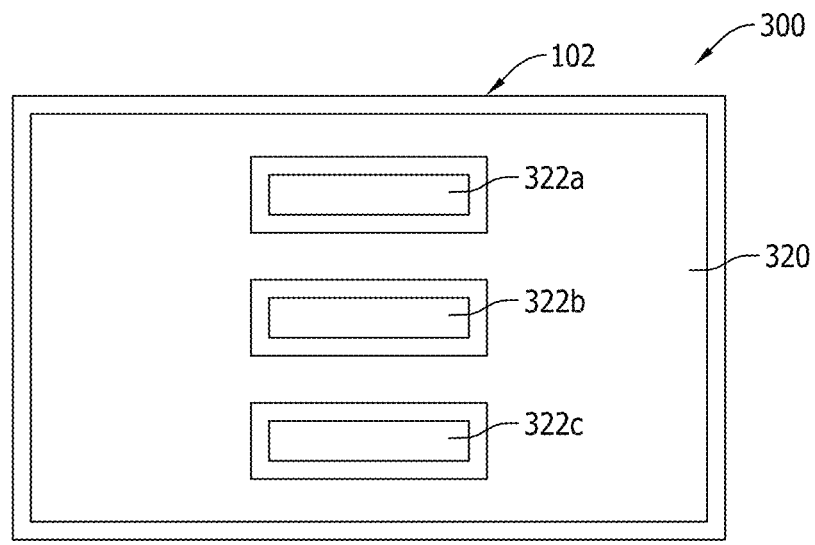
FIG. 13 diagrammatically illustrates thermal management features for the circuit protection device shown in FIGS. 10 through 12

FIG. 13 diagrammatically illustrates thermal management features for the circuit protection device shown in FIGS. 10 through 12. While as described above the hybrid device 300 is capable of operating in an arc-less manner, since arcing can depend on the nature of an electrical fault and the voltage and current of the operating power system at the time of the electrical fault, additional considerations to address any arcing that is realized must be considered.

As shown in FIG. 13, and in addition to the thermal management features described above in relation to FIG. 9 and the device 100, the device 300 includes additional features to ensure that any arcing that occurs in operation of the mechanical switch contacts is isolated from the ambient environment or otherwise is reduced to a level that is insufficient to cause ignition in a hazardous location. FIG. 13 illustrates the housing 102 of the device 300 defining a first or primary enclosure 320 and a series of secondary enclosures 322a, 322b, 322c. The secondary enclosures 322 serve to contain any electrical arcing within the secondary enclosure while ensuring that airborne ignitable gases, vapors or substances cannot reach the secondary enclosures 322a, 322b, 322c and therefore cannot be ignited by operation of the mechanical switch contacts.

In contemplated embodiments, the secondary enclosures 322a, 322b, 322c may be hermetically sealed chambers that include the respective switch contacts. The hermetically sealed chambers 322a, 322b, 322c are fluid tight such that any ignitable element of the hazardous location that may penetrate the housing 102 into the device housing 102 cannot enter the sealed chambers 322a, 322b, 322c. The hermetically sealed chambers may further be vacuum chambers or filled with inert gas that would reduce arcing intensity and duration, if not avoiding arcing altogether as the switch contacts are opened and closed. Each of the secondary enclosures 322a, 322b, 322c may be provided with additional insulation and material to contain any heat associated with arcing and localize it to the secondary enclosures 322a, 322b, 322c inside the larger enclosure 320. The enclosure within an enclosure construction of the housing 102 accommodates the other thermal management features described above, while addressing the additional concerns of the mechanical switch contacts in the hazardous location.

The secondary enclosures 322a, 322b, 322c may be fabricated from different materials than the rest of the housing 102, or a combination of materials that may be the same or different from the remainder of the housing. Metal and plastic materials may be utilized, for example, to construct the chambers while the primary enclosure and the rest of the housing may be entirely plastic. Numerous variations are possible in this regard. The secondary enclosures 322a, 322b, 322c may be prefabricated for assembly with the housing 102 at a separate stage of manufacture. The secondary enclosures 322a, 322b, 322c may enclose some or all of the mechanical circuit breaker mechanism, without impeding the path of motion of the switch contacts or their ability to move. Encapsulant and filler materials may be provided on the inner and outer surfaces of the secondary enclosures 322a, 322b, 322c to provide still further variation in thermal performance, again without impeding the path of motion of the switch contacts or their ability to move to ensure reliable disconnect functionality when actuated manually to facilitate service of the electrical power system or when actuated automatically to protect the electrical loads connected through the device 100.

Either of the devices 100 or 300 may be safely used in IEC Zone 1 or 2 and NEC Division or 1 or 2 hazardous locations, without conventional, separately provided explosion-proof enclosures. The built-in ignition protection features described above either eliminate ignition sources or reduce them to levels that are insufficient to cause ignition. The devices 100 or 300 are therefore sometimes referred to as being ignition-protected and therefor eliminate any need for a separate explosion-proof enclosure. As such, the devices 100 and 300 prevent the possible explosion that the explosion-proof enclosure conventionally exists to safely contain. The devices 100 and 300 can accordingly safely operate in hazardous locations and obviate costs and burdens of conventional explosion-proof enclosures while saving space in the electrical power system.

Figure 14:
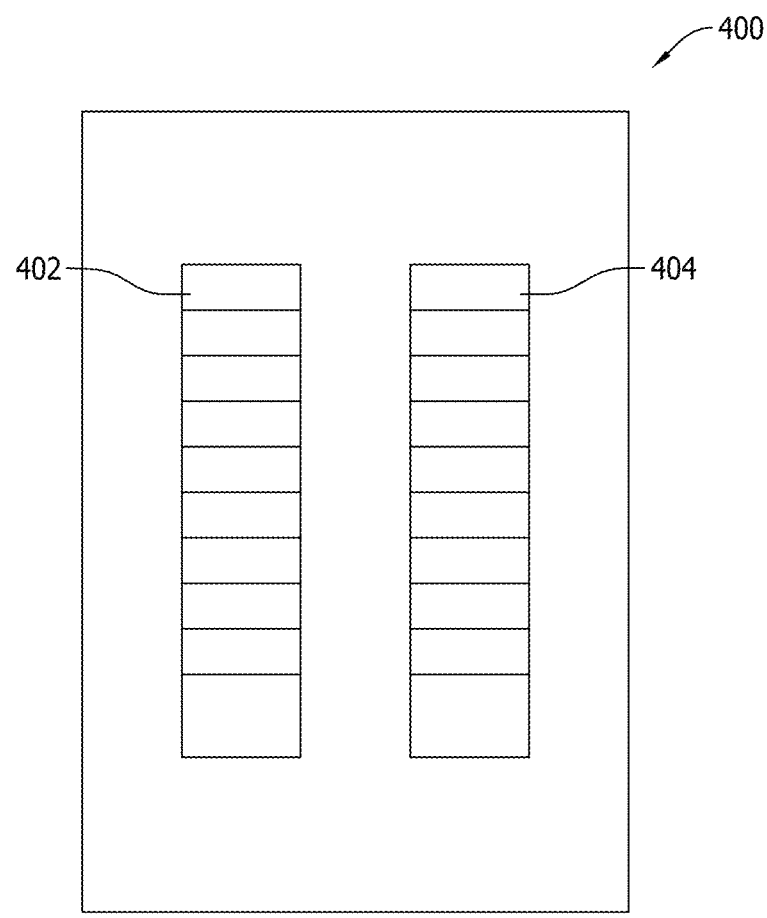
FIG. 14 illustrates an exemplary panelboard including compliant, hazardous location arc-less circuit protection devices.

FIG. 14 illustrates an exemplary panelboard 400 including compliant, hazardous location arc-less circuit protection devices including an array of devices 402, 404 arranged as two columns of devices with the devices 402, 404 located side-by-side in each column. The devices 402, 404 in each column may include the devices 100, 180, 182 and/or 300 described above, and the devices 402, 404 may be represented in different ratings offering differing degrees of circuit protection to the various different loads as loads served by the panel and its various branches. The panelboard 400 typically includes its own enclosure, but because of the ignition-protected devices 402, 404 that are utilized on the panelboard it can be a standard environmental enclosure that is not designed to be explosion-proof. Because the devices 402, 404 are ignition protected, they can reside in the panel enclosure without conventional explosion-proof enclosures in the panel enclosure either. The panel enclosure provides some protection to the devices 402, 404 from environmental conditions, but no explosion-proofing is needed by virtue of the ignition-protected devices 402, 404. Considering that known panelboards may accommodate up to 84 devices, elimination of the separately provided individual and collective explosion-proof enclosures lowers costs substantially for operation of the devices 402, 404 in hazardous locations. The costs are multiplied even further for large electrical power systems including a number of panelboards located at different locations. In contemplated embodiments, the panelboard 400 may also be a single integrated circuit device with multiple programmable channels to accommodate a desired combination of single, two and three pole circuits.

The thermal management concerns are multiplied in such a panelboard installation including numerous devices 402, 404 operating simultaneously and in close proximity to one another. Heat effects can accumulate and adjacent devices may run hotter (i.e., with higher surface temperatures) than they would if used individually, or at least spaced farther apart from one another. The devices 402, 404 in the upper portions of the columns may further run hotter than devices 402, 404 in the lower portions of the disclosure as the heat rises from the lower situated devices 402, 404. In some instances then, active cooling features and systems may be advisable to avoid undesirable temperature effects on the operation some of the devices 402, 404 or to address elevated surface temperatures. As mentioned above, an active cooling system could be provided on or in relation to the panelboard to cool devices 402, 404 at a systems level, as opposed to individually. Variations and combinations of active cooling elements and systems are possible to achieve different cooling effects.

While a panelboard and panelboard enclosure are described above for the devices 400, 402, similar benefits may be realized in motor control centers and other locations in an electrical power system wherein circuit protection devices 402, 404 are likewise located in non-explosion-proof enclosures.

Figure 15:
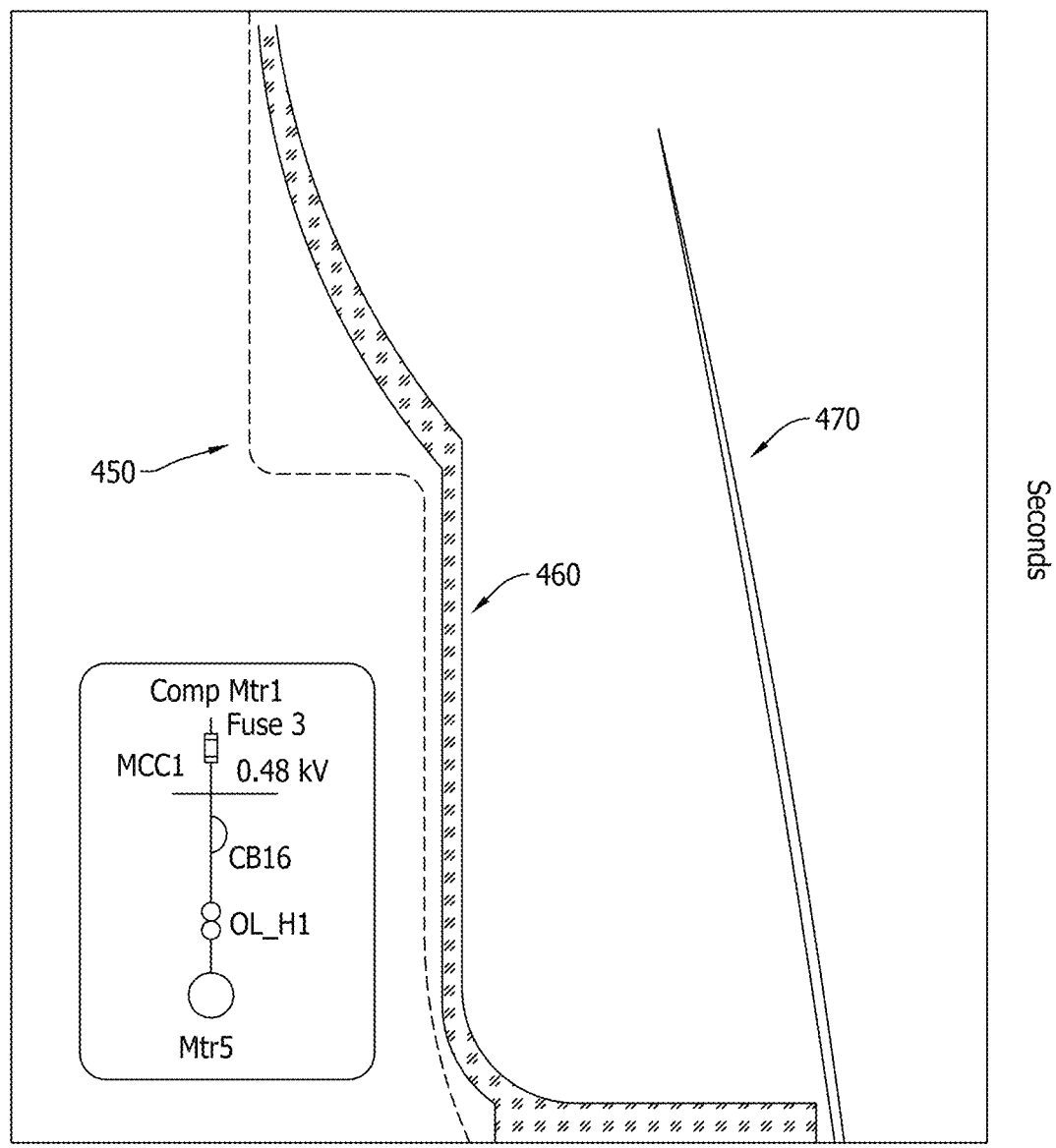
FIG. 15 illustrates an exemplary time-current profile of a configurable compliant, hazardous location arc-less circuit protection device according to another exemplary embodiment of the invention that is configured to emulate a time-current profile of an overcurrent protection fuse.
Figure 16:
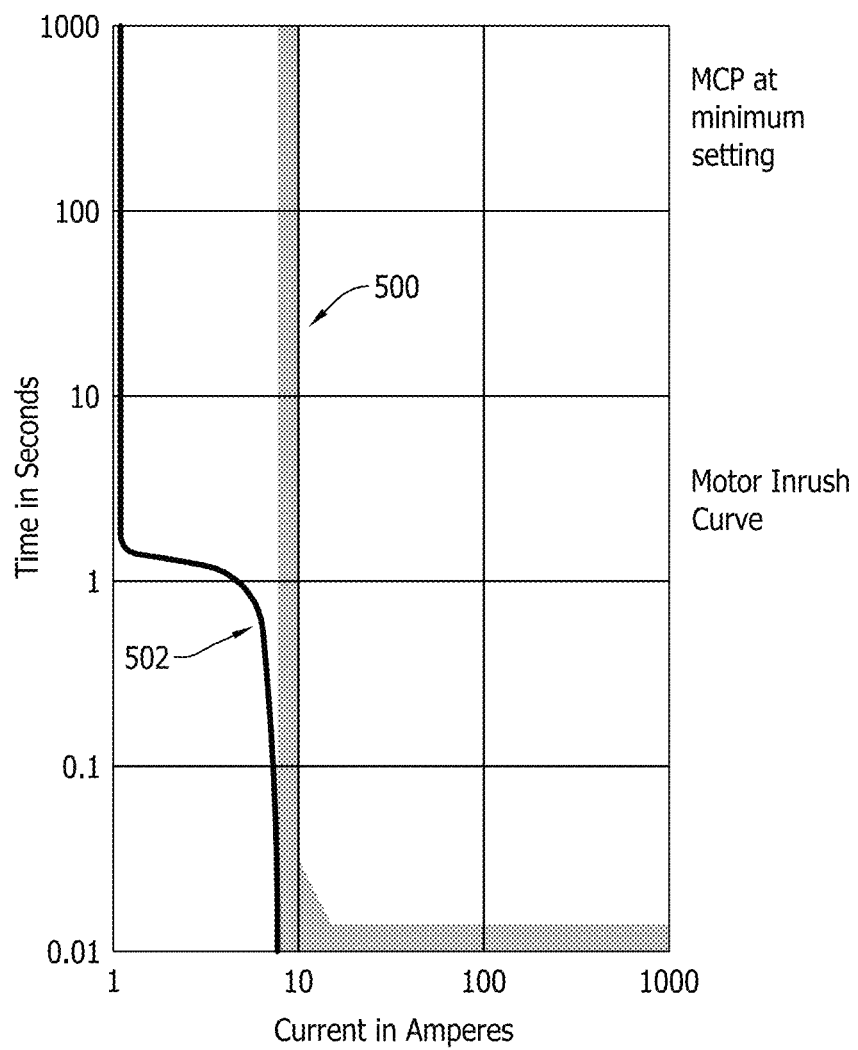
FIG. 16 illustrates an exemplary time-current profile of a configurable compliant, hazardous location arc-less circuit protection device according to another exemplary embodiment of the invention that is configured to emulate time-current profile circuit protection of motor circuit protector.
Figure 17:
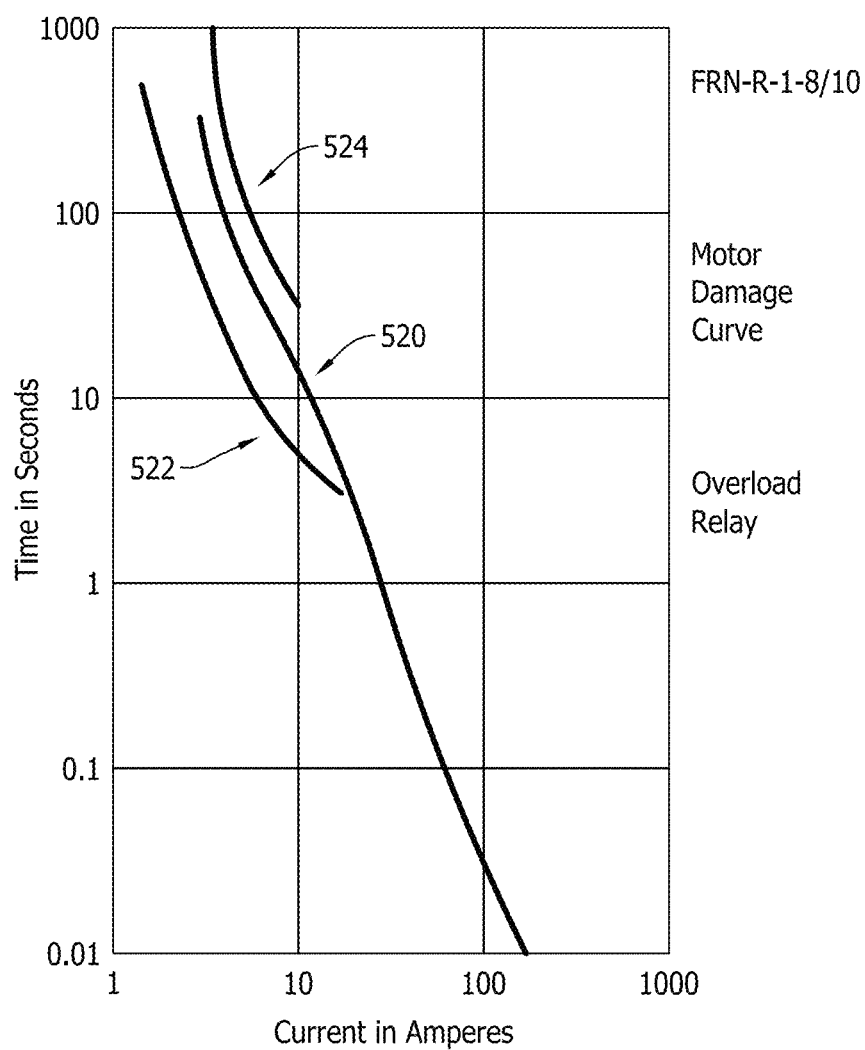
FIG. 17 illustrates an exemplary time-current profile of a configurable compliant, hazardous location arc-less circuit protection device according to another exemplary embodiment of the invention that is configured to emulate a thermal overload time-current profile for a motor circuit protector.

FIGS. 15-17 illustrate dual-function capabilities of the devices 100, 180, 182, 300, 402 and 404 described above to provide different and/or alternative types of circuit protection in a single device package that may achieve cost reduction and space savings in a hazardous location beyond elimination of otherwise conventionally provided explosion-proof enclosures.

FIG. 15 illustrates an exemplary time-current profile of a configurable compliant, hazardous location arc-less circuit protection device such as one of the devices 100, 180, 182, 300, 402 and 404 described above that is configured to emulate a time-current profile of an overcurrent protection fuse to achieve desired objectives in certain installations.

As shown in the example of FIG. 15, a combination of different types of circuit protectors is sometimes desirable to protect certain electrical loads, and a coordination of the time-current response characteristics of the different circuit protectors is required for optimal circuit protection to be achieved. For example, three time-current curves are shown in FIG. 15 as 450, 460, 470 that may be implemented with respectively different circuit protectors to provide enhanced circuit protection characteristics that none of the circuit protectors themselves could individually provide.

The time-current curve 450 represents a time-current response profile of an electronic trip profile of a circuit breaker that could be programmed into one of the devices 100, 180, 182, 300, 402 and 404 or may be implemented in a separately provided and otherwise conventional circuit breaker having an electronic trip unit to disrupt current flow through the breaker at predetermined time-current conditions represented by the time-current profile 450. The time-current profile 450 is capable of providing predetermined circuit interruption under so-called "long time", "short time" and "instantaneous" overcurrent conditions per the aforementioned definitions of a "circuit breaker" as opposed to more general switch devices having either a more limited range of overcurrent circuit-protection protection capability than a circuit breaker.

The time-current curve 460 represents a time-current response profile of a thermal-magnetic circuit breaker that likewise provides a predetermined circuit interruption under so-called "long time", "short time" and "instantaneous" overcurrent conditions. The time-current curve 460 in the example of FIG. 15 lies outside and to the right of the time-current curve 450. As such, when a device having the time-current curve 460 is connected in series with a device having the time-current curve 450, the time current-characteristics of the devices will not conflict with one another and nuisance tripping of one of the devices cannot not occur. In the example shown, the device having the time-current curve 460 will never open the circuit before the device having the time-current curve 450.

By virtue of the programmable configurability of the time-current responses of the devices 100, 180, 182, 300, 402 and 404 each of them may be selectively configured and used to implement either the time-current curve 450 or 460 and operate safely in a hazardous location without requiring a separately provided explosion-proof enclosure. That is, two such devices 100, 180, 182, 300, 402 and 404 may be connected in series with another and respectively operate according to different time-current profiles to realize similar effects to conventional coordination of different circuit protectors in an ignition protected manner for safe use in a hazardous location. Settings and inputs for specific time-current profiles (which may be similar to or different from the exemplary time-current curves 450 or 460) may be locally or remotely selected for operation of the devices 100, 180, 182, 300, 402 and 404 in the desired manner.

Likewise a device 100, 180, 182, 300, 402 and 404 may be connected to a conventional circuit breaker device with each of them respectively implementing one of the time-current curve 450 or 460, to realize the coordination in the combination of circuit breaker devices illustrated. Such conventional circuit breaker device may be enclosed in a separately provided explosion-proof enclosure in a hazardous location, but the device 100, 180, 182, 300, 402 and 404 need not be. Devices 100, 180, 182, 300, 402 and 404 can therefore be installed in a retrofit manner in existing power systems in combination with conventional non-compliant devices for use in a hazardous location and therefore require separate explosion-proof enclosures.

The time-current curve 470 shown in FIG. 15 represents a time-current response profile of an overcurrent protection fuse that may be used in combination with devices having the time-current curve 450 and/or 460. Unlike the circuit breaker time-current curves 450, 460 that are inherently discontinuous as shown in order to provide distinct so-called "long time", "short time" and "instantaneous" characteristics circuit breaker protection, the time-current curve 470 of the fuse is continuous, and also lies outside and to the right of the time-current curve 460. As such, when a device having the time-current curve 470 is connected in series with a device having the time-current curve 460, the time current-characteristics of the devices will not conflict and nuisance opening of one of the devices cannot occur. In the example shown, the device having the time-current curve 470 will never open the circuit before the device having the time-current curve 460.

By virtue of the programmable configurability of the time-current responses of the devices 100, 180, 182, 300, 402 and 404 they may each be selectively configured and used to implement either the time-current curve 470 or 460 and operate safely in a hazardous location without requiring a separately provided explosion-proof enclosure. That is, each of the devices 100, 180, 182, 300, 402 and 404 may be configured for use to exhibit the circuit protection characteristics of a circuit breaker (e.g., via the exemplary profiles 450 and 460) or to exhibit the circuit protection characteristics of a fuse (e.g., via the exemplary profile 470). Accordingly, two such devices 100, 180, 182, 300, 402 and 404 could be connected in series with each device respectively implementing the time-current curve 470 or 460, to realize the coordination in the combination of circuit breaker devices illustrated. Settings and inputs for specific time-current profiles (which may be similar to or different from the exemplary time-current curves 470, 460 or 450) may be locally or remotely selected for operation of the devices 100, 180, 182, 300, 402 and 404 in the desired manner.

Also, the time-current curve 470 could be implemented in one of a device 100, 180, 182, 300, 402 and 404 and the time-current curve 460 could be implemented in a conventional circuit breaker device that would need to be enclosed in a separately provided explosion-proof enclosure for use in a hazardous location, or in a conventional overcurrent protection fuse that may require a separately provided explosion-proof enclosure.

When a device 100, 180, 182, 300, 402 or 404 is implemented to realize the time-current curve 470, the device 100, 180, 182, 300, 402 or 404 emulates the desired circuit protection performance of the overcurrent protection fuse by tripping open at approximately the same time-current conditions as the fuse otherwise would, while still providing a conveniently resettable device to restore the full operation of affected circuitry. It should be realized, however, that in certain installations and certain circuit conditions an actual overcurrent protection fuse will inherently respond faster to short circuit conditions than certain types of circuit breakers due to fundamental differences in how fuses and circuit breakers interrupt current, and the faster response time of fuses is the primary reason why the coordination of time-current curves 470 and 460 or 450 is desirable. Nonetheless, emulation of the fuse by a device 100, 180, 182, 300, 402 or 404 in some cases may provide most of the benefits of fusible circuit protection without any need to locate a replacement fuse to restore the protected circuitry after a short circuit event that would be required if an actual overcurrent protection fuse is provided for a similar purpose.

FIG. 16 illustrates an exemplary time-current profile of a configurable compliant, hazardous location arc-less circuit protection device according to another exemplary embodiment of the invention that is configured to emulate time-current profile circuit protection of motor circuit protector. As shown in FIG. 16, a device 100, 180, 182, 300, 402 or 404 is programatically configured to exhibit a time-current profile 500 that lies outside and just to the right of a peak inrush current curve represented at 502 for a motor starting event. As such, and by virtue of the time-current profile 500, the device 100, 180, 182, 300, 402 or 404 will not trip open in response to inrush current of motor starting. Nuisance tripping of the device 100, 180, 182, 300, 402 or 404 is therefore avoided, while circuit protection is otherwise provided for non-motor starting overcurrent conditions.

The configurable programmability of the device 100, 180, 182, 300, 402 or 404 can accommodate various different inrush currents for different motor applications with a single device that may be universally used with different types of motors. Also, the time-current profile 502 is shown in FIG. 16 at a minimum setting that almost coincides with the peak in-rush current, whereas the configurable programmability of the device may likewise easily allow the time-current profile 502 to be shifted further to the right and therefore operate further outside the inrush current than shown in FIG. 16. Settings and inputs for specific time-current profiles that may be selected with respect to specific inrush current profiles may be locally or remotely selected for operation of the devices 100, 180, 182, 300, 402 and 404 in the desired manner.

FIG. 17 illustrates an exemplary time-current profile of a configurable compliant, hazardous location arc-less circuit protection device according to another exemplary embodiment of the invention that is configured to emulate a thermal overload time-current profile for a motor circuit protector. In the example of FIG. 17, three time-current curves are shown as 520, 522, 524 that in combination provide enhanced circuit protection characteristics that none of the circuit protectors themselves could individually provide to provide circuit protection for a motor.

The time-current curve 520 is that of a circuit breaker, which may be programmatically implemented in one of the configurable devices 100, 180, 182, 300, 402 or 404 described above.

To the left of the time-current curve 520 in FIG. 17 is the time-current profile 522 that is conventionally realized by a thermal overload relay provided in combination with a series-connected circuit breaker device having the time-current profile 520. As such, the overload profile 522 will respond first to an overload condition before the time-current profile 520 would.

To the right of the time-current curve 520 in FIG. 17 is a motor damage curve 524 representing threshold time-current conditions that if exceeded will cause damage to the motor wiring or other components in the motor itself. The time-current curve 520 of the circuit breaker, which may be implemented in one of the configurable devices 100, 180, 182, 300, 402 or 404 protects the motor by ensuring that current flow to the motor at all times remains below the motor damage curve 524.

The versatility of the configurable devices 100, 180, 182, 300, 402 or 404 allows them to incorporate the circuit protection of the overload profile 522, such that a thermal relay may be eliminated while providing otherwise comparable circuit protection to conventional series-connected relays and circuit breakers.

The solid state or hybrid devices such as those described above may be constructed using various different solid state switching elements, different arrangements of solid state switching elements, and also implemented in various different power electronics topologies. Various different embodiments are contemplated involving varying degrees of on-state loss, propensity to arcing in operation, conduction loss, component count, relative complexity, ability to meet specific response time characteristics, simplicity or complexity of operating algorithms, and ability to integrate motor soft-starting or other features when desired. Solid state switching elements can be connected in series or in parallel to achieve desirable voltage rating scaling or desirable current rating scaling using modular arrangements. To the extent that by-pass contacts are desirably implemented, encapsulation materials and thermal management features for the by-pass contact(s) provided may be advisable.

Any of the solid state and hybrid switch arrangements shown and described above may include or be connected to line-side electrical fuses to enhance circuit protection assurance by addressing any deficiency of the solid state switching elements with respect to certain overcurrent conditions or to improve response times to certain operating conditions.

The principles described above can easily be applied to realize circuit protection devices that are not circuit breaker devices, but are nonetheless ignition protected for use in IEC Zone 1 and NEC Division 2 hazardous locations, without separate explosion-proof enclosures. For example fusible switch disconnect devices discussed above that include mechanical switches in combination with fuses. Applying the arc-free operation, thermal management features, and modular concepts described above, a solid state fusible switch disconnect device or a hybrid fusible switch disconnect device can easily be constructed with similar benefits, but offering a different degree of circuit protection.

Likewise, the arc-free operation, secure terminal assemblies and thermal management devices described above can easily be applied to realize switching devices that do not themselves provide circuit protection, but are nonetheless ignition protected for use in IEC Zone 1 or 2 locations and NEC Division 1 and Division 2 hazardous locations, without separate explosion-proof enclosures. For example, mechanical relay switches and contactors are known that provide disconnection functionality without capability to protect against overcurrent conditions. Applying the arc-free operation, thermal management features, and modular concepts described above, a solid state relay device or a hybrid relay device, and a solid state contactor device or a hybrid contactor device can easily be constructed with similar benefits to those described above.

Ignition protected devices such as those described can be provided with any desired number of switching poles, including for example only single pole devices, two pole devices, three pole devices, and four pole devices to accommodate the needs of any type of power system, including multiphase power systems and polyphase power systems, while universally providing ignition protection for use in IEC Zone 1 or 2 and NEC Division 1 or 2 hazardous locations.

Having described devices and applicable operating algorithms functionally per the description above, those in the art may accordingly implement the algorithms via programming of the controllers or other processor-based devices. Such programming or implementation of the algorithmic concepts described is believed to be within the purview of those in the art and will not be described further.

The benefits and advantages of the inventive concepts are now believed to have been amply illustrated in relation to the exemplary embodiments disclosed.

An embodiment of a configurable modular hazardous location compliant circuit protection system for a hazardous environment has been disclosed. The system includes at least one modular switch device having a housing, a line-side terminal and a load-side terminal coupled to the housing, and a solid state switching element operable in an arc-free manner to connect the load-side terminal to the line-side terminal and disconnect the load-side terminal from the line-side terminal. The system also includes a controller configured to operate the solid state switching element to share a current load with at least one mechanical switching device to limit arcing energy to a level below that which presents an ignition concern in the hazardous location, whereby the at least one modular switch device and the at least one mechanical switching device are each compliant for use in the explosive environment without requiring a separately provided explosion-proof enclosure.

Optionally, the system may be in combination with the at least one mechanical switching device, and the at least one mechanical switching device may be provided in a separate modular package from the at least one modular switch device. The at least one modular switch device may be a single pole device, and the at least one mechanical switch device may also be a single pole device. A number of mechanical switch devices may be greater than the number of modular switch devices in the system.

As further options, the at least one modular switch device may include line and load terminals configured for plug in connection to separately provided line and load terminals. The terminals of the at least one modular switch device may be either posts or terminals for plug-in connection with the separately provided terminals. The line-side and load-side terminals and the separately provided line and load terminals may be configured in combination to reject incompatible devices from being connected. The line-side and load-side terminals and the separately provided line-side and load-side terminals are configured in combination to allow connection of the at least one modular switch device only with the proper polarity. The separately provided line-side and load-side terminals may be provided on a panelboard assembly.

The controller may optionally be separately provided from the at least one modular switch device. The at least one modular switch device and the at least one mechanical switching device may each be configured as a circuit breaker. The at least one modular switch device may be configurable to emulate the circuit protection of an overcurrent protection fuse, may be configurable to coordinate its time-current profile with a separate circuit protector, and/or may be configurable to coordinate its time-current profile with an inrush current of an electrical load. The at least one modular switch device may likewise be configurable to emulate a circuit protection profile of thermal motor protector and/or to be coordinated with a motor damage curve.

The solid state switching element may encapsulated. The at least one mechanical switching device may be sealed to prevent ingress of ignitable elements in the hazardous location. The at least one mechanical switching device may be vacuum sealed or may be filled with a dielectric material, dielectric fluid, potting material, or sand to contain, absorb or dissipate heat and energy in the operation of the solid state switching element to ensure that the surface temperature of the mechanical switching device will remain below a selected target temperature for the hazardous environment.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A configurable modular hazardous location compliant circuit protection system for an explosive environment, the system comprising:
    at least one modular switch device comprising:
        a housing;
        a line-side terminal and a load-side terminal coupled to the housing;
        a solid state switching element operable in an arc-free manner to connect the load-side terminal to the line-side terminal and disconnect the load-side terminal from the line-side terminal; and
        a controller configured to operate the solid state switching element to share a current load with at least one mechanical switching device to limit arcing energy to a level below that which presents an ignition concern in the explosive environment.

2. The system of claim 1, in combination with the at least one mechanical switching device, the at least one mechanical switching device provided in a separate modular package from the at least one modular switch device.

3. The system of claim 2, wherein the at least one modular switch device is a single pole device.

4. The system of claim 3, wherein the at least one mechanical switch device is a single pole device.

5. The system of claim 4, wherein a number of mechanical switch devices is greater than a number of modular switch devices.

6. The system of claim 1, wherein the at least one modular switch device includes line and load terminals configured for plug-in connection to separately provided line and load terminals.

7. The system of claim 6, wherein the line-side and load-side terminals of the at least one modular switch device further comprise either posts or terminals for plug-in connection with the separately provided terminals.

8. The system of claim 6, wherein the line-side and load-side terminals and the separately provided line and load terminals are configured in combination to reject incompatible devices from being connected.

9. The system of claim 6, wherein the line-side and load-side terminals and the separately provided line and load terminals are configured in combination to allow connection of the at least one modular switch device only with the proper polarity.

10. The system of claim 6, wherein the separately provided line and load terminals are provided on a panelboard assembly.

11. The system of claim 1, wherein the controller is separately provided from the at least one modular switch device.

12. The system of claim 1, wherein the at least one modular switch device and the at least one mechanical switching device are each configured as a circuit breaker.

13. The system of claim 12, wherein the at least one modular switch device is configurable to emulate the circuit protection of an overcurrent protection fuse.

14. The system of claim 12, wherein the at least one modular switch device is configurable to coordinate its time-current profile with a separate circuit protector.

15. The system of claim 12, wherein the at least one modular switch device is configurable to coordinate its time-current profile with an inrush current of an electrical load.

16. The system of claim 12, wherein the at least one modular switch device is configurable to emulate a circuit protection profile of thermal motor protector.

17. The system of claim 12, wherein the at least one modular switch device is configurable to be coordinated with a motor damage curve.

18. The system of claim 1, wherein the solid state switching element is encapsulated.

19. The system of claim 1, wherein the at least one mechanical switching device is sealed to prevent ingress of ignitable elements in the explosive environment.

20. The system of claim 1, wherein the controller is configured to program at least one of the at least one modular switch device or the at least one mechanical switching device.

* * * * *